(12) United States Patent
Farrahi Moghaddam et al.

(10) Patent No.: US 10,848,338 B2
(45) Date of Patent: Nov. 24, 2020

(54) SYSTEMS AND METHODS RELATING TO A SMART HOME MANAGER

(71) Applicant: Telefonaktiebolaget LM Ericsson (publ), Stockholm (SE)

(72) Inventors: Reza Farrahi Moghaddam, Brossard (CA); Yves Lemieux, Kirkland (CA); Mohamed Cheriet, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 94 days.

(21) Appl. No.: 15/772,897

(22) PCT Filed: Nov. 11, 2015

(86) PCT No.: PCT/IB2015/058720
§ 371 (c)(1),
(2) Date: May 2, 2018

(87) PCT Pub. No.: WO2017/081513
PCT Pub. Date: May 18, 2017

(65) Prior Publication Data
US 2018/0316518 A1   Nov. 1, 2018

(51) Int. Cl.
*H02J 3/14* (2006.01)
*H04L 12/28* (2006.01)
*H04L 12/911* (2013.01)

(52) U.S. Cl.
CPC ............ *H04L 12/2832* (2013.01); *H02J 3/14* (2013.01); *H04L 12/28* (2013.01); *H04L 47/70* (2013.01);
(Continued)

(58) Field of Classification Search
CPC ....... H04L 43/067; H04L 12/28; H04L 47/70; H02J 3/14
See application file for complete search history.

(56) References Cited

U.S. PATENT DOCUMENTS 6,947,388 B1 * 9/2005 Wagner .............. H04B 7/18595
370/252
8,183,995 B2    5/2012 Wang et al.
(Continued)

FOREIGN PATENT DOCUMENTS

WO    0072157 A1    11/2000

OTHER PUBLICATIONS

Author Unknown, "Ontario Energy Report Q1 2015—Jan.-Mar. 2015 Electricity," Independent Electricity System Operator (IESO), Ontario Energy Board, published Jun. 25, 2015, http://www.ontarioenergyreport.ca/pdfs/OntarioEnergyReportQ12015_Electricity_EN.pdf, retrieved Apr. 25, 2018, 14 pages.
(Continued)

*Primary Examiner* — Clayton R Williams
*Assistant Examiner* — Christopher B Robinson
(74) *Attorney, Agent, or Firm* — Withrow & Terranova, PLLC

(57) ABSTRACT

Systems and methods relating to a smart home system and, in particular, a manager for a smart home system are disclosed. In some embodiments, a method of operation of a manager of a smart home comprises receiving a resource request from a smart home appliance for a resource of the smart home. The resource request comprises information indicative of a resource bandwidth being requested by the smart home appliance and information indicative of a duration of time for which the resource bandwidth is being requested. The method further comprises scheduling the request based on the resource bandwidth being requested by the smart home appliance, the duration of time for which the resource bandwidth is being requested, and a total resource bandwidth limit for the smart home for the resource requested via the resource request and sending a confirma-
(Continued)

tion of a resource allocation from the manager to the smart home appliance.

22 Claims, 17 Drawing Sheets

(52) U.S. Cl.
CPC ......... *H02J 2310/14* (2020.01); *Y02B 70/325* (2013.01); *Y02B 70/3225* (2013.01); *Y02B 70/3266* (2013.01); *Y04S 20/222* (2013.01); *Y04S 20/228* (2013.01); *Y04S 20/242* (2013.01)

(56) References Cited

U.S. PATENT DOCUMENTS

| | | | |
|---|---|---|---|
| 8,554,376 | B1 | 10/2013 | Matsuoka et al. |
| 9,123,082 | B2 | 9/2015 | Hu et al. |
| 2006/0176806 | A1* | 8/2006 | Yoshihara .......... H04Q 11/0067 370/229 |
| 2011/0029348 | A1 | 2/2011 | Saffre et al. |
| 2011/0046805 | A1 | 2/2011 | Bedros et al. |
| 2011/0255502 | A1* | 10/2011 | Shen ................. H04W 72/1278 370/329 |
| 2012/0096167 | A1* | 4/2012 | Free ..................... G06F 9/5011 709/226 |
| 2012/0180064 | A1* | 7/2012 | Helander ............. G06F 9/4881 718/104 |
| 2013/0151012 | A1 | 6/2013 | Shetty et al. |
| 2015/0067170 | A1* | 3/2015 | Zhang ................. H04L 41/5051 709/226 |
| 2015/0304187 | A1* | 10/2015 | Brown ................ G06F 3/04817 715/736 |
| 2017/0104633 | A1* | 4/2017 | Wen .................... H04L 41/0896 |

OTHER PUBLICATIONS

Author Unknown, "Achieving Balance: Ontario's Long-Term Energy Plan," Independent Electricity System Operator (IESO), Queen's Printer for Ontario, Ministry of Energy, Toronto, Ontario, Nov. 2013, 92 pages.

Author Unknown, "2011 National Household Survey Highlights: Fact Sheet 5," Ontario Ministry of Finance, Office of Economic Policy Labour and Demographic Analysis Branch, last modified Aug. 23, 2013, https://www.fin.gov.on.ca/en/economy/demographics/census/nhshi11-5.pdf, retrieved Apr. 25, 2018, 3 pages.

Author Unknown, "Frequently Asked Questions: How much carbon dioxide is produced per kilowatthour when generating electricity with fossil fuels?," U.S. Energy Information Administration, Independent Statistics & Analysis, Mar. 30, 2015, http://www.eia.gov/tools/faqs/faq.cfm?id=74&t=11, retrieved Apr. 25, 2018, 1 page.

Farrahi Moghaddam, R. et al., "A Graph-Based Perspective to Total Carbon Footprint Assessment of Non-Marginal Technology-Driven Projects—Use Case of OTT/IPTV," Computing Research Repository (CoRR), arXiv:1409.0876v6, Sep. 17, 2014, 27 pages.

Malmodin, J. et al., "Life Cycle Assessment of ICT: Carbon Footprint and Operational Electricity Use from the Operator, National, and Subscriber Perspective in Sweden," Journal of Industrial Ecology, vol. 18, Issue 6, Yale Jniversity, May 16, 2014, pp. 829-845.

International Search Report and Written Opinion for International Patent Application No. PCT/IB2015/058720, dated May 20, 2016, 10 pages.

\* cited by examiner

SYSTEMS AND METHODS RELATING TO A SMART HOME MANAGER

This application is a 35 U.S.C. § 371 national phase filing of International Application No. PCT/IB2015/058720, filed Nov. 11, 2015, the disclosure of which is incorporated herein by reference in its entirety.

TECHNICAL FIELD

The present disclosure relates to a smart home system.

BACKGROUND

Smart home technology enables features such as automated climate control within the home (e.g., intelligent climate control to conserve power), automated security features (e.g., locking and unlocking of doors, activation/deactivation of a security system, etc.), automated control of entertainment devices (e.g., home theaters, whole home audio systems, etc.), and many other features. Currently available smart home systems generally fall into two different categories. In the first category, the smart home system consists of a number of sensors and actuators that form a self-governed, automated system, where there is vendor lock-in in terms of the sensors and actuators that can be used in the smart home system (i.e., the sensors and actuators of one vendor cannot communicate with sensors or actuators from another vendor). This first category of smart home systems is also referred to herein as automated home systems. In the second category, the smart home system manages activities within the home using remotely controlled, non-collaborative solutions that are enabled using gateways or an Internet of Things (IoT). This second category of smart home systems is also referred to herein as centralized smart home systems. In some cases, centralized smart home systems are provided by a single vendor. In other cases, centralized smart home systems are compatible with a limited set of "trusted" vendors and, as such, result in implicit vendor lock-in to this limited set of "trusted" vendors.

A smart home system that falls into the first category usually suffers from its present intelligence. More specifically, a smart home system that falls into the first category has a static provisioning of system behavior that is usually developed by the designer of the smart home system. Although the modeling and expression of the system behavior and its associated smart home intelligence could be highly complex, the smart home system suffers from the fact that it is incapable of evolving over time or responding to unforeseen situations.

A smart home system that falls into the second category is usually capable of evolving over time because, via its centralized approach, it is able to integrate experiences from a large number of smart home systems into its current state of intelligence. However, this type of smart home system suffers from the fact that its intelligence is centralized. Specifically, this type of smart home system has the following disadvantages:

- It may not function in favor of a particular house owner (minority vs. majority challenge in data integration which is highly related to modeling of the normal vs abnormal behavior and events).
- The level of trust is low because the centralized intelligence of this type of smart home system is usually hosted outside of the home.
- This type of smart home system is not agnostic with respect to appliances, vendors, sensors, and other artifacts, which may cause the presence of several unorganized smart home solutions at the same time in the same house in order to manage various appliances or activities.
- This type of smart home system suffers from considerable overhead, especially with respect to access bandwidth and data transfer, because the smart home system usually requires the transfer of all sensed data to a central data center prior to analysis and decision making.

One example of a smart home system is disclosed in U.S. Patent Application Publication No. 2011/0046805 A1, entitled CONTEXT-AWARE SMART HOME ENERGY MANAGER, which was published on Feb. 24, 2011 (hereinafter referred to as "the '805 Application"). In this published patent application, a Context-Aware Smart Home Energy Management (CASHEM) system is disclosed. As stated in the Abstract of the '805 Application, the "CASHEM dynamically schedules household energy to reduce energy consumption by identifying contextual information within said household, selecting a comfort of service preference, wherein said comfort of service preference is based on different said contextual information, and extracting an appliance use schedule for maximum energy savings based on said contextual information in light of said comfort of service preferences, by executing a program instruction in a data processing apparatus." The CASHEM system requires full control over the smart home operation. In other words, the CASHEM system is required to provision all possible cases and scenarios in order to handle them. This would create an uncountable set of possible implementations of the CASHEM system. Such a level of uncertainty would delay or prevent a widespread adaptation of the CASHEM system. In addition, this requirement could result in vendor lock-in, especially in the form of incompatibility of management communications between the CASHEM and the appliances. Further, the CASHEM system is highly static. If a new appliance (i.e., an appliance that is unknown to the CASHEM system) is introduced, this new appliance could not be immediately integrated. The whole logic and rule base of the CASHEM system would be required to be updated to a new version that is aware of the new appliance characteristics, especially those related to its resource consumption.

There is a need for a smart home system and method of operation thereof that addresses the problems described above.

SUMMARY

Systems and methods relating to a smart home system, and in particular a manager for a smart home system, are disclosed. In some embodiments, a method of operation of a manager of a smart home system comprises receiving, by the manager, a resource request from a smart home appliance for a resource of the smart home system. The resource request comprises information indicative of a resource bandwidth being requested by the smart home appliance and information indicative of a duration of time for which the resource bandwidth is being requested. In addition, the method comprises scheduling, by the manager, the resource request based on the resource bandwidth being requested by the smart home appliance, the duration of time for which the resource bandwidth is being requested, and a total resource bandwidth limit for the smart home system for the resource requested via the resource request. The method further comprises sending a confirmation of a resource allocation from the manager to the smart home appliance. The resource allocation is indicative of a time period during which the resource request from the smart home appliance has been scheduled. In this manner, the manager of the smart home system is able to manage resource consumption within the smart home system so as to remain within the total resource bandwidth limit(s) for the resource type(s).

In some embodiments, the total resource bandwidth limit is a soft limit on a total resource bandwidth for the smart home system for the resource requested via the resource request. Further, in some embodiments, scheduling the resource request comprises scheduling the resource request based on the resource bandwidth being requested by the smart home appliance, the duration of time for which the resource bandwidth is being requested, the soft limit, and a hard limit on the total resource bandwidth of the smart home system for the resource requested via the resource request.

In some embodiments, the resource request further comprises information indicative of a scheduling deadline for the resource request, and scheduling the resource request comprises scheduling the resource request based on the resource bandwidth being requested by the smart home appliance, the duration of time for which the resource bandwidth is being requested, the scheduling deadline for the resource request, and the total resource bandwidth limit for the smart home system for the resource requested via the resource request.

In some embodiments, the method further comprises submitting the resource allocation to a smart gateway that controls access to the resource by the smart home appliance in accordance with the resource allocation.

In some embodiments, the method further comprises determining whether the resource request is a low-bandwidth request, adding the resource request to a pool of low-bandwidth resource requests if the resource request is a low-bandwidth request, and adding the resource request to a main pool of non-executing resource requests if the resource request is not a low-bandwidth request. Further, in some embodiments, a low-bandwidth request is a resource request for a resource bandwidth that is less than a predefined threshold.

In some embodiments, the steps of receiving a resource request, determining whether the resource request is a low-bandwidth request, adding the resource request to the pool of low-bandwidth resource requests if the resource request is a low-bandwidth request, and adding the resource request to the main pool of non-executing resource requests if the resource request is not a low-bandwidth request are repeated for a plurality of resource requests. Further, in some embodiments, the method further comprises performing a scheduling process, wherein scheduling the resource request is part of the scheduling process. Performing the scheduling process comprises scheduling low-bandwidth requests that are in the pool of low-bandwidth requests independently from one another.

In some embodiments, performing the scheduling process further comprises, after scheduling low-bandwidth requests that are in the pool of low-bandwidth resource requests independently from one another, adding any unscheduled low-bandwidth requests that are in the pool of low-bandwidth requests to the main pool of non-executing resource requests.

In some embodiments, performing the scheduling process further comprises scheduling resource requests that are in the main pool of non-executing resource requests taking into consideration soft limits and/or hard limits on total resource bandwidth for corresponding resources. Further, in some embodiments, scheduling resource requests that are in the main pool of non-executing resource requests comprises scheduling resource requests that are in the main pool of non-executing resource requests taking into consideration soft limits and hard limits on total resource bandwidth for corresponding resources and deadlines for scheduling the resource requests.

In some embodiments, performing the scheduling process further comprises calculating global parameter values for the resource requests that are in the main pool of non-executing resource requests. The global parameter values of the resource requests being indicative of relative priorities of the resource requests that are in the main pool of non-executing resource requests. Performing the scheduling process further comprises scheduling the resource requests that are in the main pool of non-executing resource requests based on the global parameter values of the resource requests and a soft total resource bandwidth limit for the smart home system for a corresponding resource(s). In some embodiments, for each resource request that is in the main pool of non-executing resource requests, the global parameter value for the resource request is a function of one or more of a group of parameters consisting of: the resource bandwidth requested via the resource request, an amount of time for which the resource bandwidth is requested, a scheduling deadline for the resource request, a degree of tolerance of the resource request relative to other resource requests, a resource price for the resource requested by the resource request, and an environmental impact of the resource requested by the resource request.

In some embodiments, performing the scheduling process further comprises determining that the resource requests scheduled via the step of scheduling the resource requests that are in the main pool of non-executing resource requests do not violate corresponding scheduling deadlines, determining that there are no remaining resource requests in the main pool of non-executing resource requests to be scheduled, and, upon determining that the resource requests do not violate the corresponding scheduling deadlines and determining that there are no remaining resource requests in the main pool of non-executing resource requests to be scheduled, generating resource allocation results that are indicative of resource allocations for the resource requests resulting from performing the scheduling process.

In some embodiments, performing the scheduling process further comprises determining that at least one of the resource requests scheduled via the step of scheduling the resource requests that are in the main pool of non-executing resource requests violates a corresponding scheduling deadline and, upon determining that at least one of the resource requests scheduled via the step of scheduling the resource requests that are in the main pool of non-executing resource requests violates a corresponding scheduling deadline, increasing a limit on a total resource bandwidth for the smart home system for the resource requested via the at least one of the resource requests from a soft limit to a value that is greater than the soft limit and less than or equal to a hard limit. Performing the scheduling process further comprises repeating the steps of calculating the global parameter values and scheduling the resource requests based on the increased limit.

In some embodiments, performing the scheduling process further comprises determining that at least one of the resource requests scheduled via the step of scheduling the resource requests that are in the main pool of non-executing resource requests violates a corresponding scheduling deadline and, upon determining that at least one of the resource requests scheduled via the step of scheduling the resource requests that are in the main pool of non-executing resource requests violates a corresponding scheduling deadline, adjusting, directly or indirectly, the global parameter value for the at least one of the resource requests. Performing the scheduling process further comprises repeating the step of scheduling the resource requests.

In some embodiments, performing the scheduling process further comprises determining that the resource requests scheduled via the step of scheduling the resource requests that are in the main pool of non-executing resource requests do not violate corresponding scheduling deadlines, determining that there are remaining resource requests in the main pool of non-executing resource requests to be scheduled, and, upon determining that the resource requests do not violate the corresponding scheduling deadlines and determining that there are remaining resource requests in the main pool of non-executing resource requests to be scheduled, determining whether any additional resource requests can be scheduled for a current time instance for which scheduling is being performed. Performing the scheduling process further comprises, upon determining that additional resource requests can be scheduled for the current time instance, scheduling at least one of the remaining resource requests for the current time instance; and, upon determining that additional resource requests cannot be scheduled for the current time instance, proceeding to perform scheduling for a next time instance.

In some embodiments, the method further comprises adding the resource request to a main pool of non-executing resource requests. Further, in some embodiments, the steps of receiving a resource request and adding the resource request to the main pool of non-executing resource requests for a plurality of resource requests. Further, in some embodiments, the method further comprises performing a scheduling process, where scheduling the resource request is part of the scheduling process. Performing the scheduling process comprises scheduling resource requests that are in the main pool of non-executing resource requests taking into consideration soft limits and/or hard limits on total resource bandwidth for corresponding resources. Further, in some embodiments, scheduling resource requests that are in the main pool of non-executing resource requests comprises scheduling resource requests that are in the main pool of non-executing resource requests taking into consideration soft limits and hard limits on total resource bandwidth for corresponding resources and deadlines for scheduling the resource requests.

Embodiments of a manager of a smart home system are also disclosed.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Smart Home:

As used herein, the term "smart home" or "smart house" refers to a residence of a person, group of people, or family (or other resident(s)) that is equipped with smart home technology or, in other words, equipped with a smart home system.

Smart Home Component:

As used herein, the term "smart home component" refers to a device, or component, of a smart home system (e.g., a sensor, an actuator, an appliance, etc.).

Smart Home Appliance:

As used herein, a "smart appliance" or "smart home appliance" is a particular type of smart home component that consumes some resource (e.g., energy/power/electricity, Internet bandwidth, water, etc.). As described herein, there may be different categories, or types, of smart home appliances including functional smart home appliances (i.e., smart home appliances that provide some function within the smart home such as, for example, a refrigerator, a thermostat, a light or lighting system, etc.). Some other examples of categories of smart home appliances are observer smart home appliances (e.g., appliances that handle or manage sensors), communication and command smart home appliances, and behavior analysis smart home appliances. Further, smart home appliances may be physical appliances (e.g., a device including hardware and software components) or virtual appliances (e.g., a software application executing on a computer or tablet).

Smart Gateway:

As used herein, a "smart gateway" is a particular type of smart home component that, potentially among other things, controls consumption of a resource(s) by a smart home appliance(s).

Utility Smart Meter:

As used herein, a "utility smart meter" is a third party device that may be placed by utility companies/entities at the boundary of the smart home for their own purpose. Note that, in some embodiments, the smart gateway and the utility smart meter are separate. However, in other embodiments, the functionality of the smart gateway may be implemented in the utility smart meter.

Resource Bandwidth:

As used herein, "resource bandwidth" refers to an amount of a resource (e.g., Watts or Amperes for electricity, Megabits per second (Mbps) for Internet, gallons per unit of time (e.g., second) for water, etc.).

Figure 1:
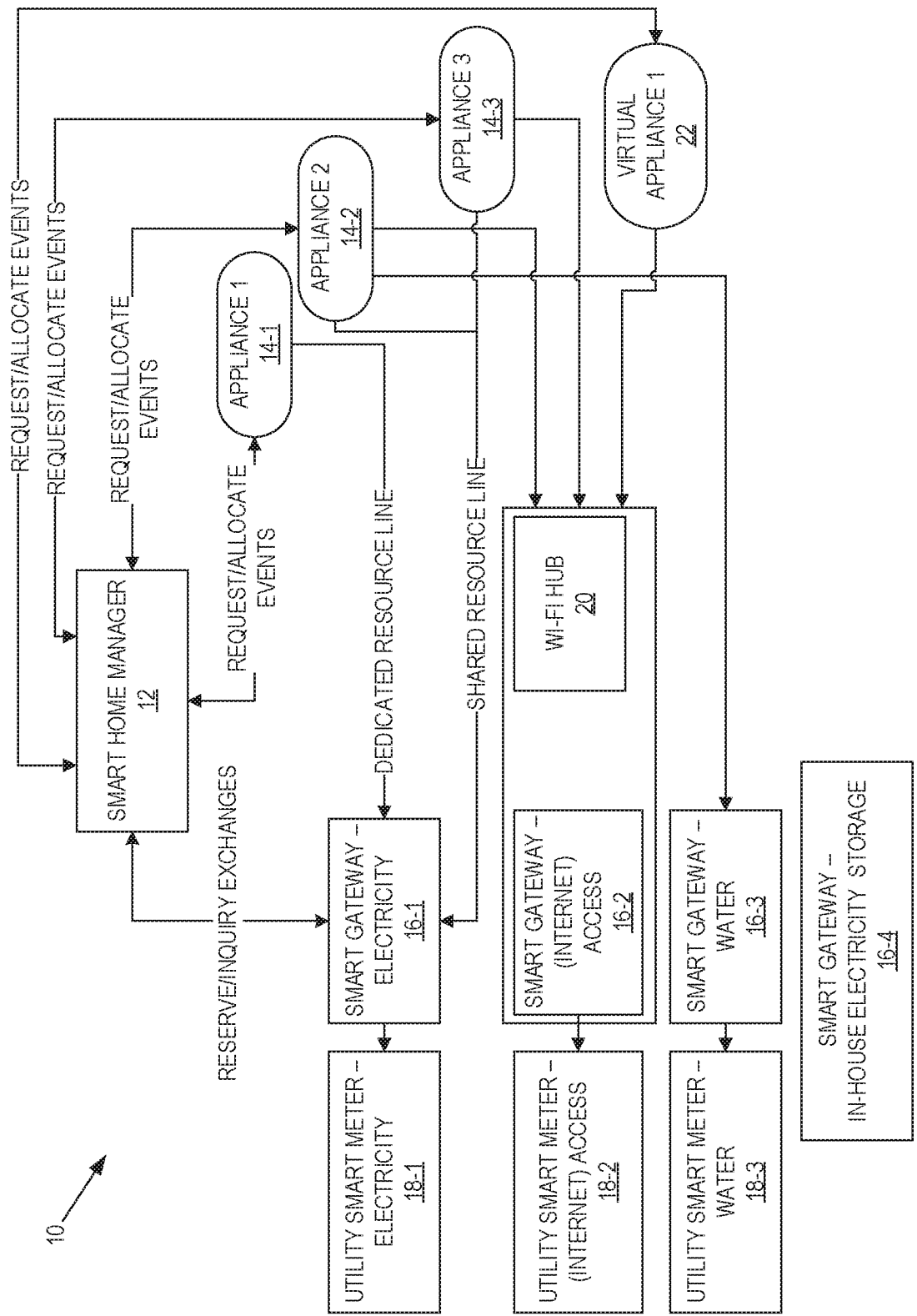
FIG. 1 illustrates one example of a smart home system including a smart home manager according to some embodiments of the present disclosure.

Embodiments of a smart home system and, in particular, a smart home manager for a smart home system, and methods of operation thereof are disclosed. In this regard, FIG. 1 illustrates one example of a smart home system 10 according to some embodiments of the present disclosure. The smart home system 10 is implemented within a home or residence of a person or group of people (e.g., a family). The smart home system 10 generally includes a smart home manager 12 that manages, or governs, scheduling of resources (e.g., electricity/power, Internet, water, and/or the like) by smart home appliances 14-1 through 14-3 (generally referred to herein collectively as smart home appliances 14 and individually as smart home appliance 14).

At the system level, the smart home system 10 provides a consistent environment governed by the smart home manager 12. The main purpose of the smart home manager 12 is to schedule resource allocation (e.g., best effort resource allocation) for the smart home appliances 14 to ensure a highly livable environment for the smart home while also minimizing or reducing resource consumption and/or violation of a limit(s) on resource consumption by the smart home system 10.

At the component level, the smart home system 10 includes the smart home manager 12. The smart home manager 12 is implemented in a combination of hardware and software (e.g., one or more processors (e.g., Central Processing Units (CPUs), Application Specific Integrated Circuits (ASICs), Field Programmable Gate Arrays (FPGAs), and/or the like, or any combination thereof) that execute one or more software modules). In some embodiments, the smart home manager 12 is a stand-alone device. In other embodiments, the smart home manager 12 is implemented in another device or system (e.g., as software executing on a personal computer). The smart home system 10 also includes smart gateways 16-1 through 16-4 (generally referred to herein collectively as smart gateways 16 and individually as smart gateway 16). In this particular example, the smart gateways 16-1 through 16-4 are smart gateways for electricity, Internet, water, and in-house electricity storage, respectively. The smart gateways 16 are implemented in hardware or a combination of hardware and software (e.g., one or more processors executing one or more software modules). A smart gateway 16 of a particular resource type (e.g., electricity/power, Internet, water, or the like) enforces resource allocations scheduled by the smart home manager 12 and communicated to the smart gateway 16. In addition, in some embodiments, the smart gateway 16 reports actual resource consumption of the respective resource type, which may be obtained from, e.g., a respective meter 18, back to the smart home manager 12.

More specifically, the smart gateway 16-1 interfaces to a utility smart meter 18-1 for electricity and operates to enforce usage of electricity in the smart home according to the resource allocations scheduled by the smart home manager 12, as discussed below. In a similar manner, the smart gateway 16-2 interfaces to a utility smart meter 18-2 for Internet access and operates to enforce usage of the Internet in the smart home according to the resource allocations scheduled by the smart home manager 12, as discussed below. Notably, in this example, the smart gateway 16-2 is integrated with a Wi-Fi hub, or router, 20, but is not limited thereto. Lastly, the smart gateway 16-3 interfaces to a utility smart meter 18-3 for water and operates to enforce usage of water in the smart home according to the resource allocations scheduled by the smart home manager 12, as discussed below. In this example, the smart home system 10 also includes a smart gateway 16-4 for in-house electricity storage (e.g., a battery or battery stack). The utility smart meters 18-1 through 18-3 are generally referred to herein collectively as utility smart meters 18 and individually as utility smart meter 18. Also, while illustrated as being separate from the respective utility smart meters 18, the smart gateways 16 may alternatively be integrated with or implemented as part of the respective utility smart meters 18.

The smart home system 10 also includes the smart home appliances 14. The smart home appliances 14 are implemented in hardware or a combination of hardware and software, depending on the particular smart home appliance type. In general, a smart home appliance 14 consumes at least one type of resource and is capable of communicating with the smart home manager 12 to, e.g., request a resource allocation for one or more resource types. For example, a smart home appliance 14 may consume electricity/power, Internet bandwidth, water, and/or the like. Some examples of smart home appliances 14 are, but are not limited to, an Air Conditioning (A/C) unit, a thermostat, a refrigerator, a light bulb, a television, a smart television, a dishwasher, etc. A dishwasher is an example of a smart home appliance 14 that consumes two types of resources, namely, electricity and water. Notably, the capability of the smart home appliance 14 to communicate with the smart home manager 12 may be implemented within the smart home appliance 14 (i.e., native to the smart home appliance 14) or may be added to an existing non-smart home appliance, e.g., via an adaptor, which may be implemented as hardware, software, or a combination thereof depending on the particular implementation. The smart home appliance 14 may be a standalone appliance or an appliance that represents a group of other appliances (e.g., lights), e.g., that are distributed throughout the smart home. In some embodiments, in order for the smart home appliances 14 to be compatible with the smart home manager 12, the smart home appliances 14 need only be capable of communicating, e.g., resource requests, to the smart home manager 12 using a predefined, generic syntax (e.g., an Application Program Interface (API)-like form of communication).

Notably, in some embodiments, the smart home system 10 may include a virtual appliance(s) 22. The virtual appliance 22 is a smart home appliance that is instantiated in software (e.g., an application running on a computing device such as a personal computer, a tablet computer, or the like). Otherwise, the virtual appliance 22 operates in the same manner as the smart home appliances 14.

The smart home appliances 14 include functional smart home appliances and may also include other types of smart home appliances such as observer smart home appliances and/or communication/command smart home appliances. Functional smart home appliances are those smart home appliances 14 (and potentially those virtual appliances 22) that provide some function in the smart home (e.g., heating/cooling, refrigeration, lighting, media playback, etc.). Conversely, observer smart home appliances are those smart home appliances 14 (and potentially those virtual appliances 22) that do not provide any direction function or service to the smart home or other appliances 14, 22 and, in general, consume minimal resources. Instead, the observer smart home appliances sense the environment of the smart home (e.g., temperature, ambient light, human feelings (e.g., happy, bored, afraid, etc.), air quality, acoustic noise level, motion sensors (e.g., earthquake motion sensors that may, for example, be tied into a public safety system), infrared sensors (e.g., for home intrusion), etc.) and communicate the sensed data to the smart home manager 12 and/or other smart home appliances 14, 22. In some embodiments, an observer appliance is a sensor or an appliance that represents a group of sensors that are, e.g., distributed throughout the house.

Communication/command smart home appliances are those smart home appliances 14 (and potentially those virtual appliances 22) that operate to enable the smart home manager 12 to communicate its recommendations to the smart home, or residence, while at the same time receive on-the-fly commands. The recommendations could be sourced from behavior analysis virtual smart appliances along with explicit functions to be executed or from society-originated initiatives (e.g., an initiative to migrate from conventional light bulbs to Light Emitting Diode (LED) light bulbs) to remind the resident(s) of the smart home of possible renovation or credit programs.

The smart home appliances 14 and, specifically, the virtual appliance(s) 22 may, in some embodiments, include behavior analysis (virtual) appliances. In some embodiments, the behavior analysis appliance(s) is implemented within the smart home manager 12 (e.g., software executed by one or more processors of the smart home manager 12). The algorithms and associated code for the behavior analysis appliance(s) is, at least in some embodiments, imported from a remote repository (e.g., an open-source repository accessible via a wide area network such as, e.g., the Internet). In some embodiments, there is no egress flow of data from the behavior analysis appliance(s) to any node external to the smart home. Within the smart home, the output of the behavior analysis appliance(s) may be, for example, long term or spontaneous recommendations, alerts, or other signals to the smart home or residents of the smart home or a public safety department. In some embodiments, the recommendations are validated by the smart home manager 12 before being communicated to the smart home or residents of the smart home via the communication/command appliance(s). In some embodiments, the smart home manager 12 may attempt to execute the recommendations.

Figure 2:
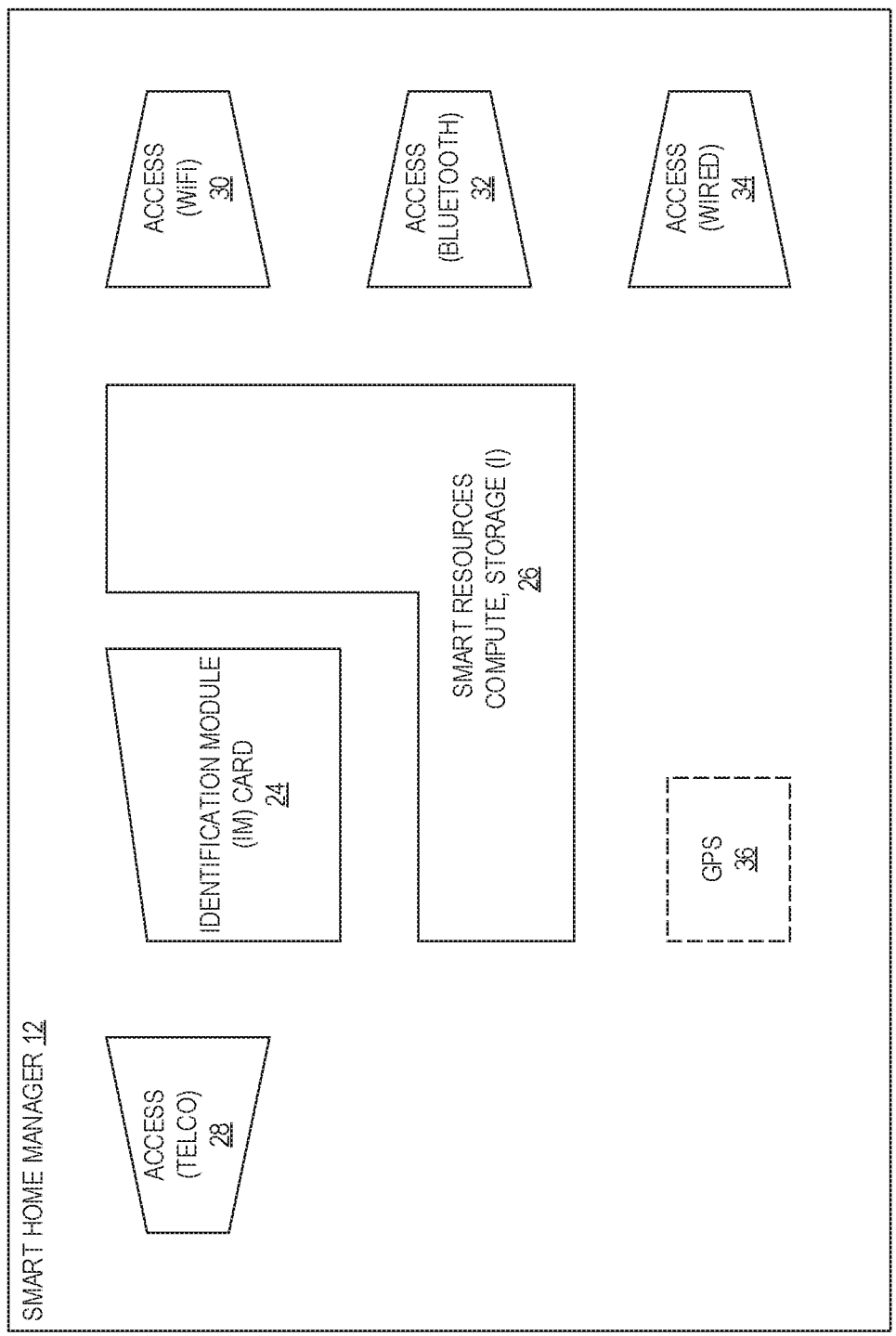
FIG. 2 illustrates one example implementation of the smart home manager of FIG. 1 according to some embodiments of the present disclosure.

FIG. 2 illustrates one example implementation of the smart home manager 12. Note that the embodiment of FIG. 2 is only an example. In this example, the smart home manager 12 includes an Identification Module (IM) card 24, compute and storage resources 26, a telco interface 28, intra-house connectivity sub-components 30-34, and (optionally) a Global Positioning System (GPS) receiver 36.

The IM card 24 is a hardware card issued to the owner/resident of the smart home by an associated authority. The authority could, for example, allow a utility company(ies) or institution(s) to issue IM cards 24 to the residents of smart homes or to the smart homes themselves. However, the IM cards 24 are preferably agnostic with respect to the authority that issues them or the authority that enforces them. The IM cards 24 are used to authenticate or enforce the ownership of the household among other functions. GPS spatial location and similar information could be used to by the IM card 24 to validate the correctness of its placement. Also, similar IM cards 24 may be used to enable and connect communications/command appliances to the smart home ecosystem. For example, a smart home appliance 14 may include an IM card that is authenticated at the point of packaging. When the smart home appliance 14 then comes into the smart home, using the IM card, the smart home appliance 14 will automatically engage the smart home manager 12 and join the smart home system 10 without any need for human intervention for set-up.

The compute and storage resources 26 include one or more processors (e.g., CPUs, ASICs, FPGAs, and/or the like) and one or more storage components (e.g., memory) that store software that, when executed by the one or more processors, provide the functionality of the smart home manager 12 described herein. In some embodiments, the software code is imported into the compute and storage resources 26 after being validated by the IM card 24. In some embodiments, a telco channel is utilized for importation of at least some of the code of the smart home manager 12.

The telco interface 28 includes radio hardware and associated software needed to establish data connectivity with a telecommunications network. In some embodiments, the telco interface 28 provides a secure and safe channel for communicating code to the smart home manager 12 and, potentially, a safe and secure channel for signaling with other entities.

In this example, the intra-house connectivity sub-components 30-34 include a WiFi interface 30, a Bluetooth interface 32, and a wired interface 34 (e.g., an Ethernet interface). The intra-house connectivity sub-components 30-34 provide interfaces for communication between the smart home appliances 14, 22 and the smart home manager 12. In some implementations, the optional GPS receiver 36 obtains a position or location that can be used to enforce a requirement of spatial closeness of the smart home manager 12 to the actual home in which the smart home system 10 is implemented (e.g., the address to which the IM card 24 is registered).

Figure 3:
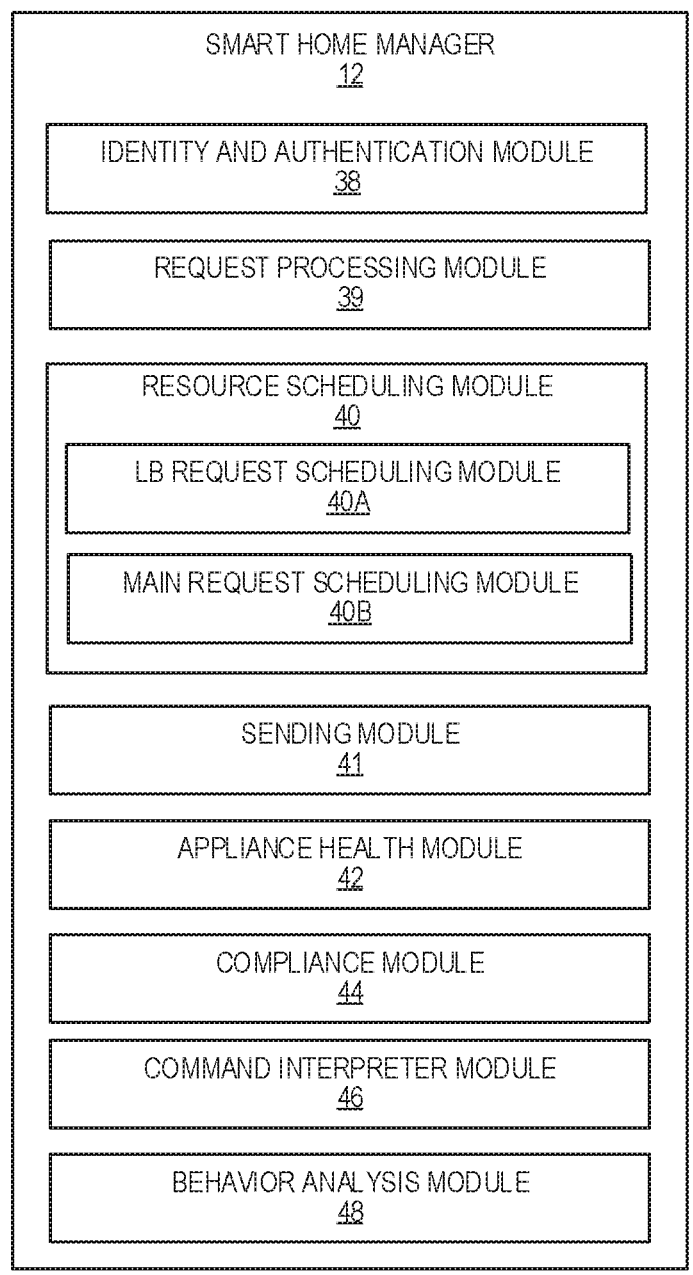
FIG. 3 is a block diagram of the smart home manager of FIG. 1 including a number of software sub-components, or modules, according to some embodiments of the present disclosure.

FIG. 3 is a block diagram of the smart home manager 12 including a number of software sub-components, or modules, according to some embodiments of the present disclosure. As illustrated, the smart home manager 12 includes an identity and authentication module 38, a request processing module 39, a resource scheduling module 40, a sending module 41, an appliance health module 42, a compliance module 44, a command interpreter module 46, and a behavior analysis module 48. Note that, in some embodiments, the smart home manager 12 may not include all of the modules 38-48. For example, in some embodiments, the smart home manager 12 includes the resource scheduling module 40 and, optionally, any combination of one or more of the other modules 38 and 44-48.

The identity and authentication module 38 is, in some implementations, code embedded into the IM card 24. The request processing module 39 operates to receive resource requests and insert the resource request into a queue or pool of resource requests to be processed by the resource scheduling module 40.

The resource scheduling module 40 operates to schedule resource allocations for the smart home appliances 14 and the virtual appliances 22, as described below. In some embodiments, the scheduling algorithm utilized by the resource scheduling module 40 optimizes and minimizes resource consumption and also the associated cost. For instance, in some embodiments, it can be assumed that the consumption cost per unit of resource varies over time, at least for some resource types. For example, the cost of electricity may be higher during peak hours. In some embodiments, the resource scheduling module 40 schedules resource allocations based on one or more limits (e.g., a soft limit and a hard limit) on the resource consumption for one or more resource types for the smart home (e.g., soft and/or hard limits on total resource bandwidth permitted for the smart home for a resource type). Each resource type may have its own associated limit(s). The limit(s) are preferably not under the control of the user/operator/resident. Rather, the limit(s) are preferably set by some external entity(ies). In some particular embodiments, for a specific resource type, the resource scheduling module 40 schedules resource allocations for consumption of the resource by respective smart home appliances 14, 22 based on a soft limit for the resource type and a hard limit for the resource type for the smart home. In some embodiments, the soft limit is avoided in a best effort manner without dropping any resource requests, whereas the hard limit is enforced by dropping the least important resource request(s). In some embodiments, the dropping of the least important resource request(s) may be performed in a recommend and confirm cycle with the resident(s) of the smart home, if possible. Note that other scheduling algorithms for scheduling resource requests may be used.

In some embodiments, the resource scheduling module 40 includes a Low Bandwidth (LB) request scheduling module 40A that operates to schedule LB resource requests and a main request scheduling module 40B that operates to schedule non-LB resource requests and, in some embodiments, any LB resource requests that are unable to be scheduled by the LB request scheduling module 40A.

The sending module 41 operates to send resource allocations generated by the resource scheduling module 40 to the respective smart home appliances 14, 22 and/or the respective smart gateways 16.

The appliance health module 42 operates to keep track of the status of connected/registered smart home appliances 14, 22. In some embodiments, signaling between the smart home appliance 14, 22 and the smart home manager 12 is event-based. In this case, the appliance health module 42 ensures that a smart home appliance 14, 22 functional even if there has not been an event (e.g., a resource request or command) that has been placed between the smart home appliance 14, 22 and the smart home manager 12. The appliance health module 42 may determine the status of each smart home appliance 14, 22 using any appropriate technique such as, for example, periodically pinging or querying the smart home appliances 14, 22 to check their statuses.

As discussed below, in each cycle of a resource request and allocation, the amount of resource consumed by a smart home appliance 14, 22 could be higher than that which was allocated to it by the smart home manager 12. The compliance module 44 uses resource consumption reports from the smart gateways 16 and the resource allocations scheduled by the resource scheduling module 40 in order to validate the compliance of the smart home appliances 14, 22. Especially in cases where more than one smart home appliance 14 use the same resource line to access the respective smart gateway 16, the compliance module 44 may, for example, require special patterns of resource utilization in order to identify the smart home appliance 14 that is violating its resource allocation.

The command interpreter module 46 operates to translate commands sent to the smart home manager 12 from a resident via the communications/command appliance into actual functions of the functional smart home appliances. This operation is called a command/function cycle. If the command cannot be translated (e.g., the command has failed), the command interpreter module 46 may, in some embodiments, generate a set of recommendations and provide the set of recommendations to the resident or possibility a safety department. Also, in some embodiments, command/function cycles of the command interpreter module 46 are communicated with the behavior analysis appliance(s) in order to, e.g., plan for long-term recommendations toward reducing the ratio of failed commands.

The behavior analysis module 48 is, in this example, illustrated as part of the smart home manager 12. However, the behavior analysis module 48 may alternatively be implemented in a separate behavior analysis smart home appliance, as discussed above. In some embodiments, the behavior analysis module 48 receives data and logs of activities within the smart home, e.g., at a level of detail determined by the resident(s) or owner of the smart home when, e.g., the IM card 24 was issued. In order words, in some embodiments, the level of detail provided to the behavior analysis module 48 cannot be modified without re-issuing a new IM card 24. The behavior analysis module 48 discovers patterns and anomalies in the activities, and then compiles on-the-fly or long-term recommendations in the form of functions or renovations that would be communicated with the owner/resident by the smart home manager 12.

Figure 4:
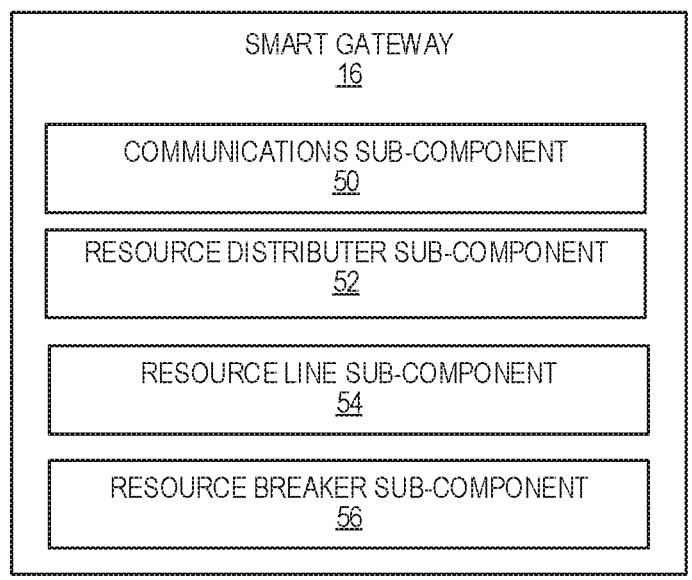
FIG. 4 is a block diagram of a smart gateway according to some embodiments of the present disclosure.

FIG. 4 is a block diagram of a smart gateway 16 according to some embodiments of the present disclosure. In this example, the smart gateway 16 includes four sub-components, each of which may be implemented in software, but is not limited thereto. As illustrated, in this example, the smart gateway 16 includes a communications sub-component 50, a resource distributer sub-component 52, a resource line sub-component 54, and a resource breaker sub-component 56, each of which may, in some embodiments, be implemented as a software module. The communications sub-component 50 receives resource allocations from the smart home manager 12 for the associated resource and sends out resource consumption reports for the associated resource to the smart home manager 12. The resource distributer sub-component 52 operates to deliver different amounts of the associated resource to each resource line connected to the smart gateway 16 based on the resource allocations received from the smart home manager 12. The resource line sub-component 54 is a resource path that delivers the allocated amount of the associated resource to a single smart home appliance 14, 22 or a group of smart home appliances 14, 22. In the latter case, the resource line is referred to herein as a shared resource line. The resource breaker sub-component 56 operates to disconnect a respective resource line from a source of the associated resource in the case of, for example, a violation of the corresponding scheduled resource allocation, e.g., in order to protect the resource distributer sub-component 52 from failing.

Figure 5:
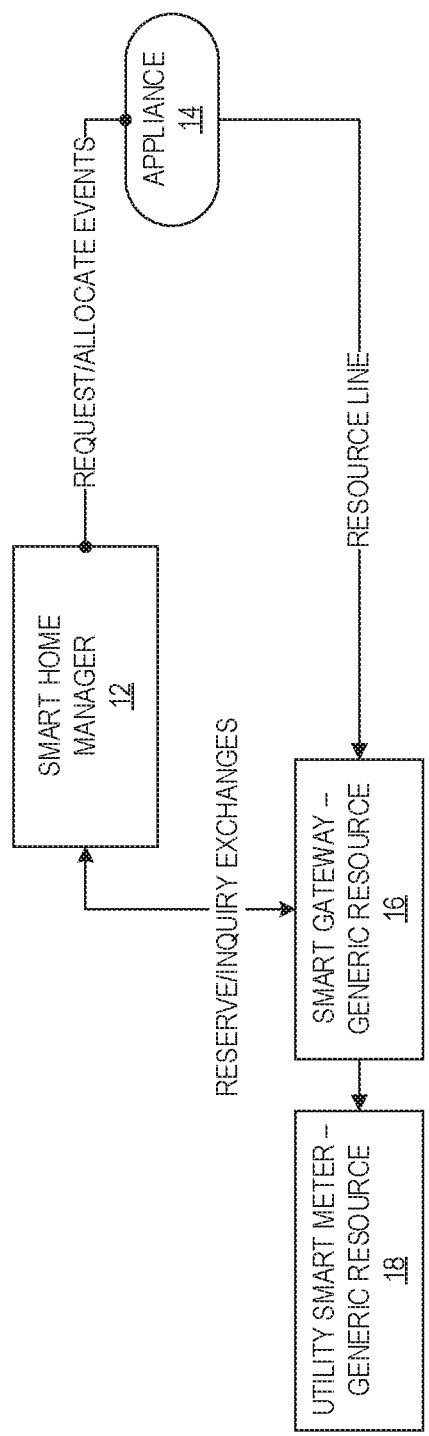
FIG. 5 illustrates a resource request and resource allocation cycle according to some embodiments of the present disclosure.

The smart home system 10 generally enables two operations, namely, resource requests and resulting resource allocations for the smart home appliances 14, 22 and commands from an operator/resident/owner of the smart home. In this regard, FIG. 5 illustrates a resource request and resource allocation cycle according to some embodiments of the present disclosure. In this example, the smart home appliance 14 sends a resource request to the smart home manager 12 via its associated connectivity channel to the smart home manager 12 (e.g., a WiFi connection, a Bluetooth connection, or a wired connection). This is referred to as a resource request event. The smart home appliance 14 has already been registered with the smart home manager 12. As discussed below, the resource request is a request for a desired resource bandwidth of a particular resource. The resource request may include additional parameters such as, for example, a duration of consumption of the requested resource at the requested resource bandwidth (which is also referred to herein as a consumption period), a scheduling deadline (i.e., a latest acceptable time that the resource request can be scheduled), etc. Notably, the smart home appliance 14 may set the resource bandwidth based on a resource consumption characteristic known to the smart home appliance 14 (e.g., the smart home appliance 14 knows that it consumes X Watts of electricity power during operation).

The smart home manager 12 receives the resource request and, in some embodiments, validates the identity of the smart home appliance 14. In addition, in some embodiments, the smart home manager 12 may request that the behavior analysis smart home appliance or module validate the resource request as being consistent with known or prior behavior of the smart home appliance 14. Once validation is complete, the smart home manager 12 places the resource request into a queue or pool of resource requests to be scheduled by the resource scheduling module 40 of the smart home manager 12.

The resource scheduling module 40 of the smart home manager 12 schedules the resource request along with any other resource requests received from other smart home appliances 14, 22, as described below. Any suitable scheduling algorithm may be used. For example, in some embodiments, the resource scheduling module 40 uses a greedy algorithm to allocate available resources to the most important smart home appliances 14, 22 (e.g., those smart home appliances 14, 22 that are in critical need of the requested resources). The scheduling results in a resource allocation for the smart home appliance 14, where the resource allocation defines a time period during which the smart home appliance 14 is permitted to use the requested bandwidth of the requested resource. The resource scheduling module 40 keeps track of all resource allocations for the smart home for the current time as well as for future times.

The smart home manager 12 communicates the resource allocation back to the smart home appliance 14 as well as to the smart gateway 16 for the requested resource. The smart home appliance 14 may, in some embodiments, object to the resource allocation, in which case the smart home manager 12 may take an appropriate action (e.g., re-schedule the request with higher priority).

The smart gateway 16 reports the actual resource consumption back to the smart home manager 12. If the resource allocation is violated (i.e., if the actual resource consumption violates the resource allocation), the smart home manager 12 may take appropriate action. For example, the smart home manager 12 may instruct the smart gateway 16 to disconnect the corresponding resource line to prevent further resource consumption by the smart home appliance 14. If the smart home appliance 14 is connected via a shared resource line, the smart home manager 12 make take appropriate actions to identify which of the smart home appliances 14 sharing the shared resource line is violating its resource allocation and then take appropriate action.

Figure 6:
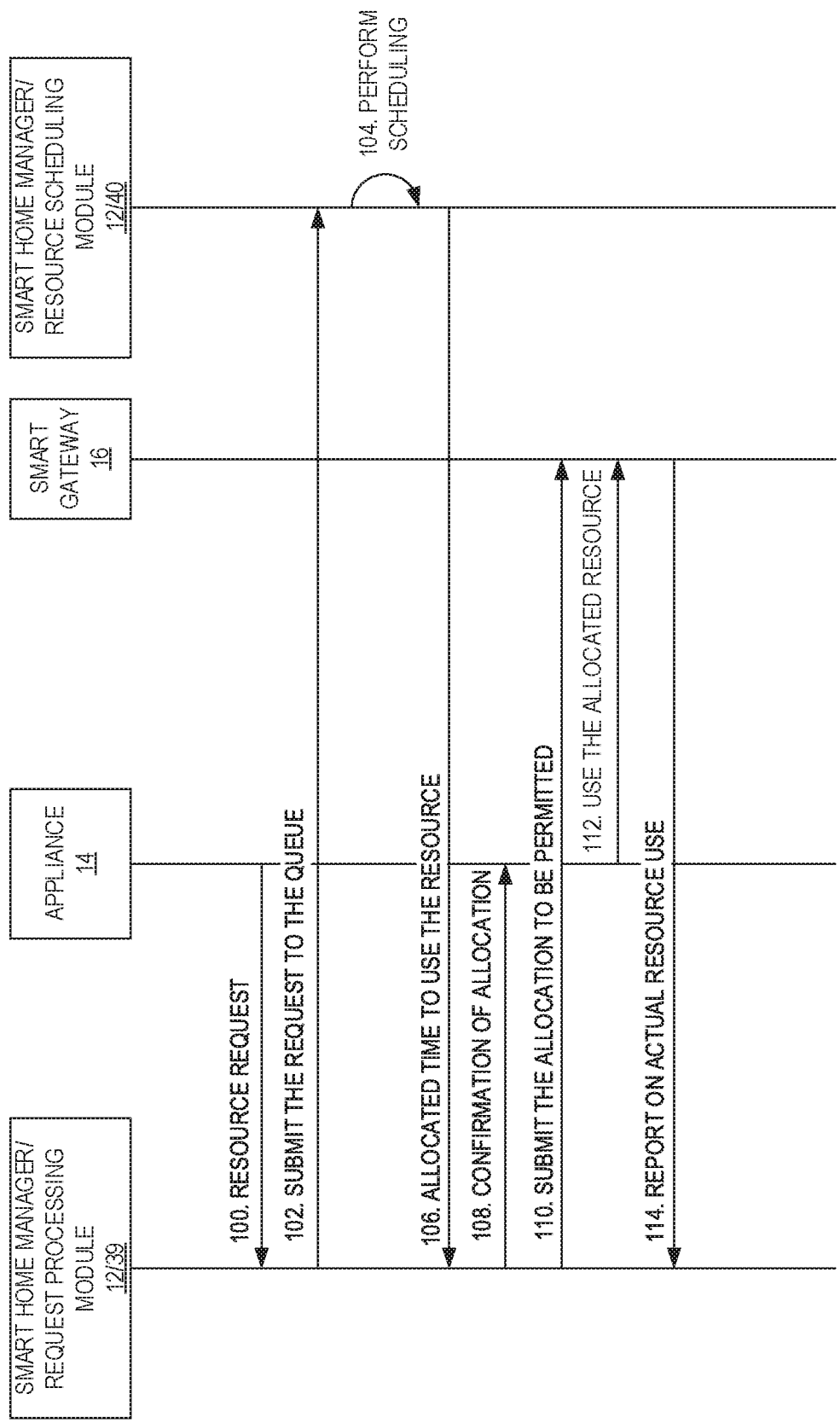
FIG. 6 illustrates the resource request and resource allocation process of FIG. 5 in more detail according to some embodiments of the present disclosure.

FIG. 6 illustrates the resource request and resource allocation process of FIG. 5 in more detail according to some embodiments of the present disclosure. As illustrated, the smart home appliance 14 sends a resource request to the smart home manager 12 (step 100). Note that this process is equally applicable to the virtual appliance 22. As discussed below, in some embodiments, the resource request includes an amount of resources requested (referred to herein as a resource bandwidth) and, in some embodiments, one or more of: an identifier of the smart home appliance 14 making the request, a type of the smart home appliance 14 making the request, an identifier of the resource requested, an expected amount of time that the smart home appliance 14 will consume the requested amount of the resource, a latest acceptable time for scheduling the request (i.e., the latest acceptable time that the smart home appliance 14 can access the resource), and an indicator of the damage or risk if the smart home appliance 14 is not able to access the requested resource. The smart home manager 12 maintains up-to-date information for all active resource requests. Note that an active resource request includes resource requests that have not yet been scheduled, resource requests that have been scheduled but execution has not yet began, and resource requests that have been scheduled and are executing (i.e., the respective smart home appliance 14 is currently consuming the requested resource as scheduled).

The smart home manager 12, and in particular the resource scheduling module 40 of the smart home manager 12, receives the resource request and submits the resource request to the resource scheduling module 40 of the smart home manager 12 (step 102). The resource scheduling module 40 of the smart home manager 12 performs scheduling of resource requests, including the resource request received from the smart home appliance 14 (step 104). For scheduling, as discussed below in detail, the resource scheduling module 40 may take into account profiles such as, for example, price per consumption of a resource unit over time, environmental impact per consumption of a resource unit over time, credit (provided by, e.g., a utility company) per resource unit not consumed over time, and/or price per consumption of a resource unit when a total resource consumption of the smart home is higher than a soft limit for that particular resource. The scheduling process uses the resource requests and, in some embodiments, one or more of the profiles mentioned above to converge to resource allocations for the resource requests in real-time.

In some embodiments, the scheduling process uses a combination of greedy and heuristic multi-objective optimizers to arrive at the optimal resource allocations. In some embodiments, the resource scheduling module 40 avoids violating a soft limit(s) on the total resource consumption (also referred to herein as total resource bandwidth) for the smart home for a resource(s). In some embodiments, if allocation of resources for all of the resource requests, or at least those resource requests that are considered critical, is not possible within the total bandwidth available, the resource scheduling module 40 increases the total bandwidth available for scheduling from the soft limit to some value that is less than or equal to a hard limit and, potentially, drops some non-critical resource requests. At the same time, the resource scheduling module 40 may issue warnings and/or recommendations to the owner/resident of the smart home. Determining whether a resource request is critical is, at least in some embodiments, based on a relative importance of the resource requests or respective smart home appliance 14 as defined by the owner/resident of the smart home.

The scheduling process results in a resource allocation for the smart home appliance 14. In this example, this resource allocation is communicated from the resource scheduling module 40 of the smart home manager 12 to the request processing module 39 of the smart home manager 12 (step 106). In this example, the resource allocation is in the form of an allocated time in which the smart home appliance 14 is permitted to use the requested resource.

The request processing module 39 of the smart home manager 12 then sends a confirmation of the resource allocation to the smart home appliance 14 (step 108) and also sends, or submits, the resource allocation to the appropriate smart gateway 16 (step 110). With respect to the smart gateway 16, the resource allocation is indicative of the amount of the respective resource permitted to be used by the smart home appliance 14. This amount is referred to herein as a resource bandwidth. For instance, the smart home appliance 14 may be allocated a resource bandwidth X (e.g., X Watts of electricity power), where the allocated resource bandwidth is preferably the requested resource bandwidth. In addition, the resource allocation preferably indicates a time period over which the smart home appliance 14 is permitted to consume the allocated resource bandwidth (e.g., X Watts permitted to be consumed over Y period of time (e.g., over 10 minutes spanning the time window of 1:00 PM to 1:10 PM)).

Note that, in some embodiments, the resource scheduling module 40 may review resource allocations during idle times to determine whether a more optimal resource allocation can be achieved. If so, the resource scheduling module 40 can update the resource allocations.

The smart home appliance 14 uses the allocated resources (step 112). The smart gateway 16 sends a report detailing the actual resources used by the smart home appliance 14 to the request processing module 39 of the smart home manager 12 (step 114).

Figure 7A:
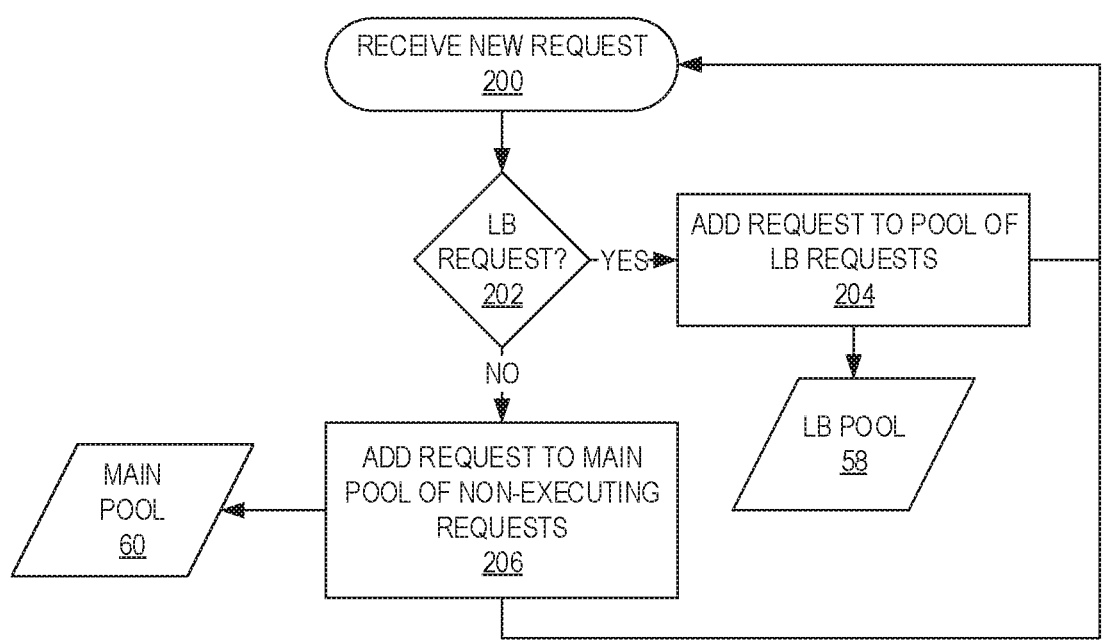
FIGS. 7A through 7C illustrate the operation of the smart home manager of FIG. 1 in more detail according to some embodiments of the present disclosure.
Figure 7B:
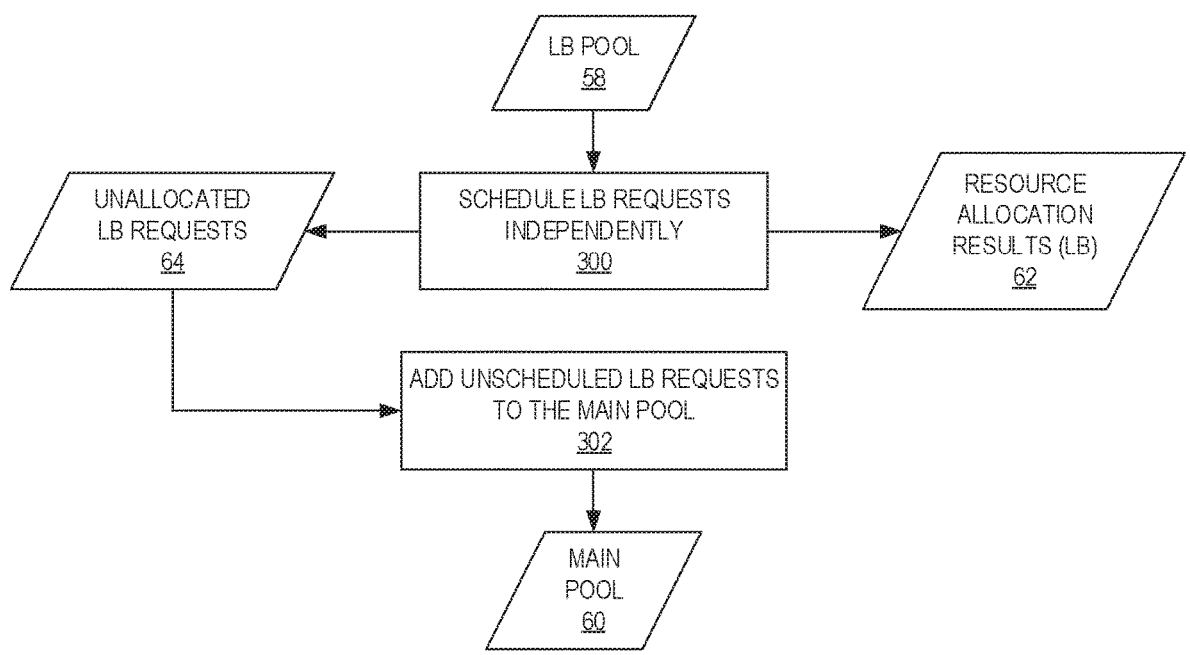
Figure 7C:
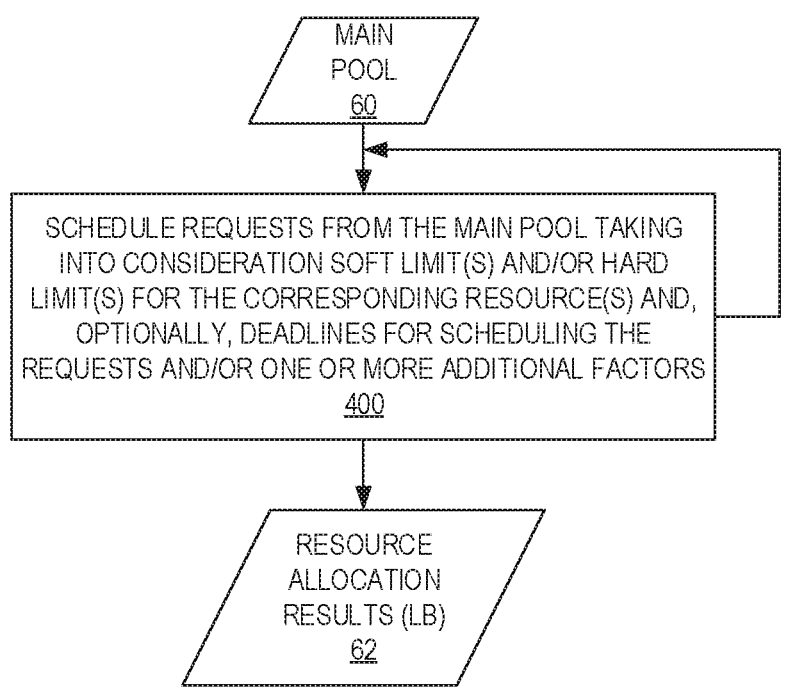

FIGS. 7A through 7C illustrate the operation of the smart home manager 12 in more detail according to some embodiments of the present disclosure. In particular, FIG. 7A illustrates the operation of the request processing module 39 of the smart home manager 12 to receive and process resource requests according to some embodiments of the present disclosure. FIGS. 7B and 7C illustrate the operation of the resource scheduling module 40 of the smart home manager 12 to perform scheduling according to some embodiments of the present disclosure. Note that the processes of FIGS. 7A through 7C are only an example. In some embodiments, less than all of the illustrated steps can be performed. For instance, in some embodiments, the smart home manager 12 does not distinguish between LB requests and non-LB requests, in which case steps 202 and 204 of FIG. 7A and steps 300 and 302 of FIG. 7B are not performed. Further, while the term "steps" is used herein, the use of the term "steps" is not to be construed as limiting the "steps" or respective functions in any particular order unless explicitly stated or otherwise required.

As illustrated in FIG. 7A, the request processing module 39 of the smart home manager 12 receives a resource request from the smart home appliance 14 (step 200). Note that while the smart home appliance 14 is used in this example, the discussion is equally applicable to the virtual appliance 22. Further, the smart home appliance 14 is preferably a functional smart home appliance, but is not limited thereto. In general, the resource request is a request to use, or consume, a particular type of resource. In this embodiment, the resource request includes at least a resource bandwidth that is requested by the smart home appliance 14.

The request processing module 39 determines whether the resource request is a LB request (step 202). As used herein, a LB request is a resource request for a resource bandwidth that is less than a predefined threshold (e.g., 10% of the total bandwidth (soft limit) allocated for LB requests, and 1% of the total bandwidth (i.e., 10% of the LB bandwidth) as the predefined threshold). The predefined threshold may be the same for all resource types or may be different for different resource types. If the resource request is a LB request, then the request processing module 39 adds the resource request to a pool of LB resource requests, which is referred to as a LB pool 58, (step 204). The process then returns to step 200 and is repeated upon receiving a new resource request. Returning to step 202, if the resource request is not a LB request, the request processing module 39 adds the resource request to a main pool 60 of non-executing resource requests (step 206), and the process then returns to step 200 and is repeated upon receiving a new resource request. As used herein, a non-executing resource request is a request in the main pool 60 that either has not received its resource allocation from the smart home manager 12 or has received the confirmed time interval allocated to it but has not reached that time interval (i.e., scheduled but not yet consuming). In this manner, resource requests are added to the appropriate pool 58 or 60 as the resource requests are received.

FIG. 7B illustrates the operation of the resource scheduling module 40 of the smart home manager 12 to schedule LB requests in the LB pool 58 according to some embodiments of the present disclosure. As illustrated, the resource scheduling module 40 schedules LB requests independently from one another and independently from the resource requests in the main pool 60 (step 300). In some embodiments, the LB requests are scheduled within a predefined amount of the soft or hard limit on the total amount of resource bandwidth for the smart home for the respective resource type(s). For example, LB requests for a particular resource type are scheduled (e.g., on a first-come-first-serve basis) until the aggregate resource bandwidth allocated for the LB requests reaches a predefined limit for LB requests for that resource type (e.g., 10% of a soft or hard limit on the total resource bandwidth that can be consumed by the smart home system 10 for that resource type). The scheduling results in resource allocation results 62 for the LB requests. Further, any LB requests in the LB pool 58 that are unable to be scheduled are added to a pool of unallocated LB requests 64. The unscheduled LB requests in the pool of unallocated LB requests 64 are added to the main pool 60 (step 302).

Notably, the process of FIG. 7B is repeated over time in order to perform scheduling in a periodic manner in order to stay up to date with respect to new coming requests and also changes in the past requests. For example, the process of FIG. 7B may be repeated for each X unit time period, where X unit can be any suitable amount of time (e.g., seconds or minutes) and may vary depending on resource type.

FIG. 7C illustrates the operation of the resource scheduling module 40 of the smart home manager 12 to schedule resource requests in the main pool 60 according to some embodiments of the present disclosure. As illustrated, the resource scheduling module 40 schedules resource requests from the main pool 60 taking into consideration soft limit(s) and/or hard limit(s) on the total resource bandwidth consumed by the smart home system 10 for the respective resource(s) and, optionally, deadlines for scheduling the resource requests and/or one or more additional factors (e.g., price profiles for the resources that give price per unit of the resource for, e.g., different times of the day, environmental impact profiles for the resources that give the environmental impact per unit of the resource for, e.g., different times of the day, etc.) (step 400). Note that the profiles may, in some cases, be adjusted by external entities (e.g., utility companies) and pushed to the smart home manager 12. The deadline for scheduling a resource request may, for example, be included in the resource request and defines a latest time that is acceptable for scheduling the resource request. The soft and/or hard limits may be the same for all resources or may be different for different resource types. The results of the scheduling are stored as the resource allocation results 62 for the resource request in the main pool 60. A resource allocation for a resource request defines a time period in which the respective smart home appliance 14 is permitted to use the requested resource.

Note that FIGS. 7A through 7C are only examples. The processes may vary depending on the particular implementation. For example, in some embodiments, all resource requests are added to the main pool 60 and scheduled according to the process of FIG. 7C (i.e., LB requests are treated the same as non-LB requests).

Figure 8A:
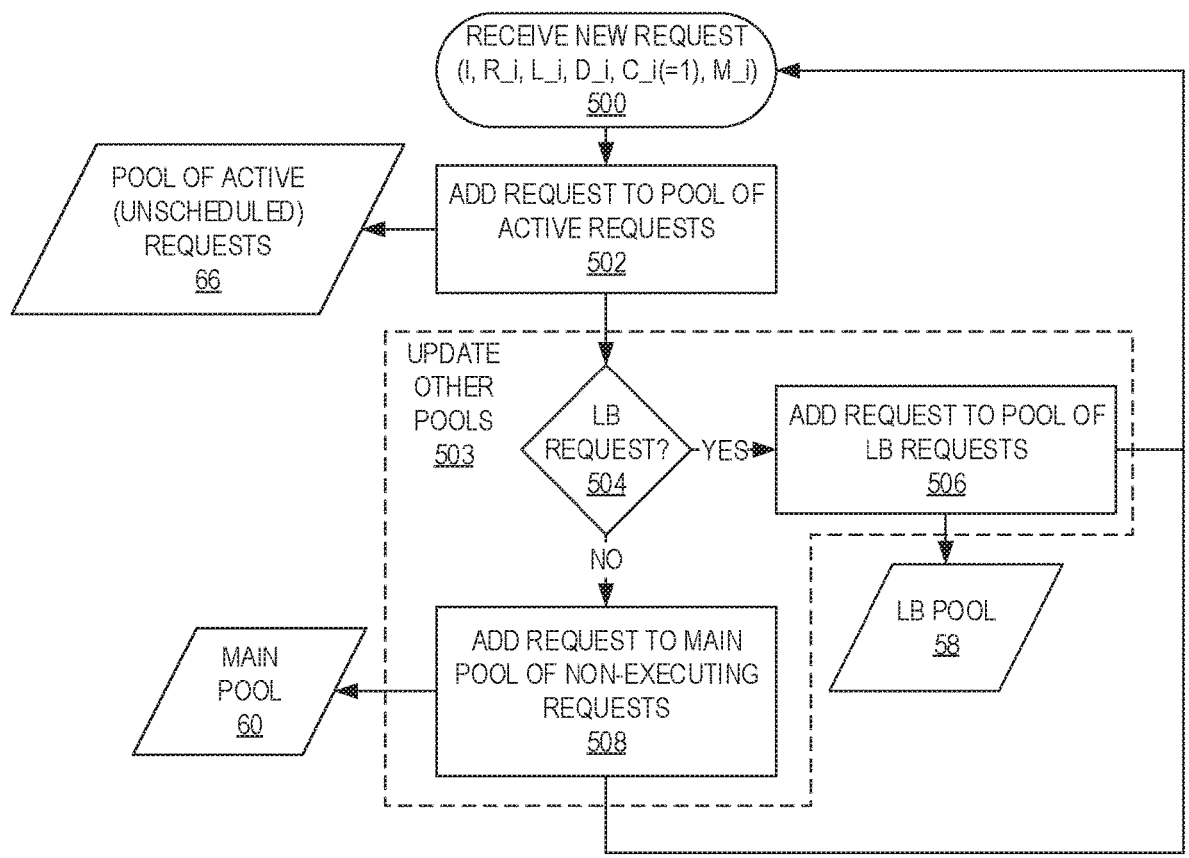
FIGS. 8A through 8F illustrate the operation of the smart home manager of FIG. 1 in more detail according to some other embodiments of the present disclosure.
Figure 8B:
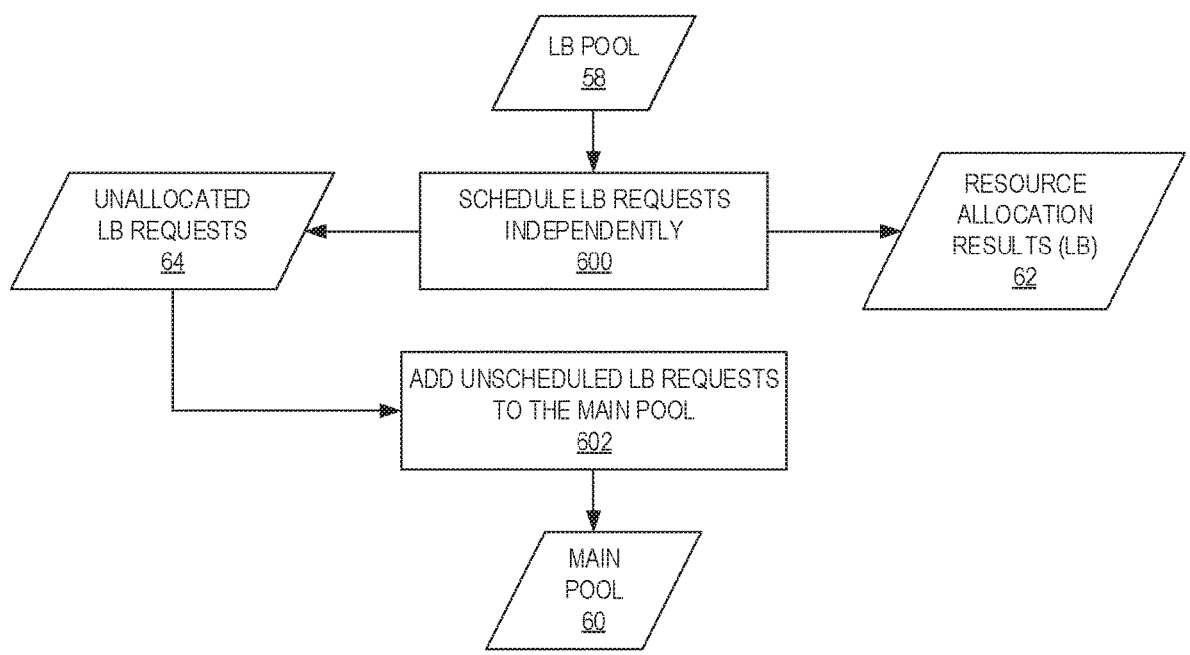

FIGS. 8A through 8F illustrate the operation of the smart home manager 12 in more detail according to some other embodiments of the present disclosure. In particular, FIG. 8A illustrates the operation of the request processing module 39 of the smart home manager 12 to receive and process resource requests according to some embodiments of the present disclosure. FIG. 8B illustrates the operation of the resource scheduling module 40 of the smart home manager 12 to perform scheduling of LB requests according to some embodiments of the present disclosure, and FIGS. 8C through 8F illustrate the operation of the resource scheduling module 40 of the smart home manager 12 to perform scheduling of resource requests other than those scheduled by the process of FIG. 8C according to some embodiments of the present disclosure.

As illustrated in FIG. 8A, the request processing module 39 of the smart home manager 12 receives a resource request from the smart home appliance 14 (step 500). Note that while the smart home appliance 14 is used in this example, the discussion is equally applicable to the virtual appliance 22. Further, the smart home appliance 14 is preferably a functional smart home appliance, but is not limited thereto. In general, the resource request is a request to use, or consume, a particular type of resource. In this embodiment, the resource request is described as a record in the form of a tuple: (i, $R\_i$, $L\_i$, $D\_i$, $C\_i(=1)$, $M\_i$), where i is the record index and identifier, $R\_i$ is the amount of resources requested in the form of a resource bandwidth (such as Watts for electricity), $L\_i$ is the duration that the resource would be used, $D\_i$ is the latest bearable time that the resource should be allocated without a failure in the requester appliance, $C\_i$ (=1) is the consumption feature, and $M\_i$ is the degree of tolerance of the request relative to the others. Note that, in some embodiments, the user/operator/resident is able to configure or adjust the degree of tolerance values for requests from different smart home appliances 14, 22. A copy of the original values of a request tuple is kept for cases that reset to the original values, which is required when performing scheduling.

The request processing module 39 adds the resource request to a pool of active (unscheduled) resource requests 66 (step 502). The request processing module 39 processes by the resource request by updating the other pools of resource requests, namely, the LB pool 58 and the main pool 60 (step 503). More specifically, the request processing module 39 determines whether the resource request is a LB request (step 504). As used herein, a LB request is a resource request for a resource bandwidth that is less than a predefined threshold (e.g., 10% of the total bandwidth (soft limit) allocated for LB requests, and 1% of the total bandwidth (i.e., 10% of the LB bandwidth) as the predefined threshold). The predefined threshold may be the same for all resource types or may be different for different resource types. If the resource request is a LB request, then the request processing module 39 adds the resource request to the pool of LB resource requests, which is referred to the LB pool 58, (step 506). The process then returns to step 500 and is repeated upon receiving a new resource request. Returning to step 504, if the resource request is not a LB request, the request processing module 39 adds the resource request to the main pool 60 of non-executing resource requests (step 508), and the process then returns to step 500 and is repeated upon receiving a new resource request. In this manner, resource requests are added to the appropriate pool 58 or 60 as the resource requests are received.

FIG. 8B illustrates the operation of the resource scheduling module 40 of the smart home manager 12 to schedule LB requests in the LB pool 58 according to some embodiments of the present disclosure. This process is the same as that described above with respect to FIG. 7B, but is also included here for completeness. As illustrated, the resource scheduling module 40 schedules LB requests independently from one another and independently from the resource requests in the main pool 60 (step 600). In some embodiments, the LB requests are scheduled within a predefined amount of the soft or hard limit on the total amount of resource bandwidth for the smart home for the respective resource type(s). For example, LB requests for a particular resource type are scheduled until the aggregate resource bandwidth reaches a predefined limit for LB requests for that resource type (e.g., 10% of a soft or hard limit on the total resource bandwidth that can be consumed by the smart home system 10 for that resource type). The scheduling results in resource allocation results 62 for the LB requests. Further, any LB requests in the LB pool 58 that are unable to be scheduled are added to a pool of unallocated LB requests 64. The unscheduled LB requests in the pool of unallocated LB requests 64 are added to the main pool 60 (step 602).

Figure 8C:
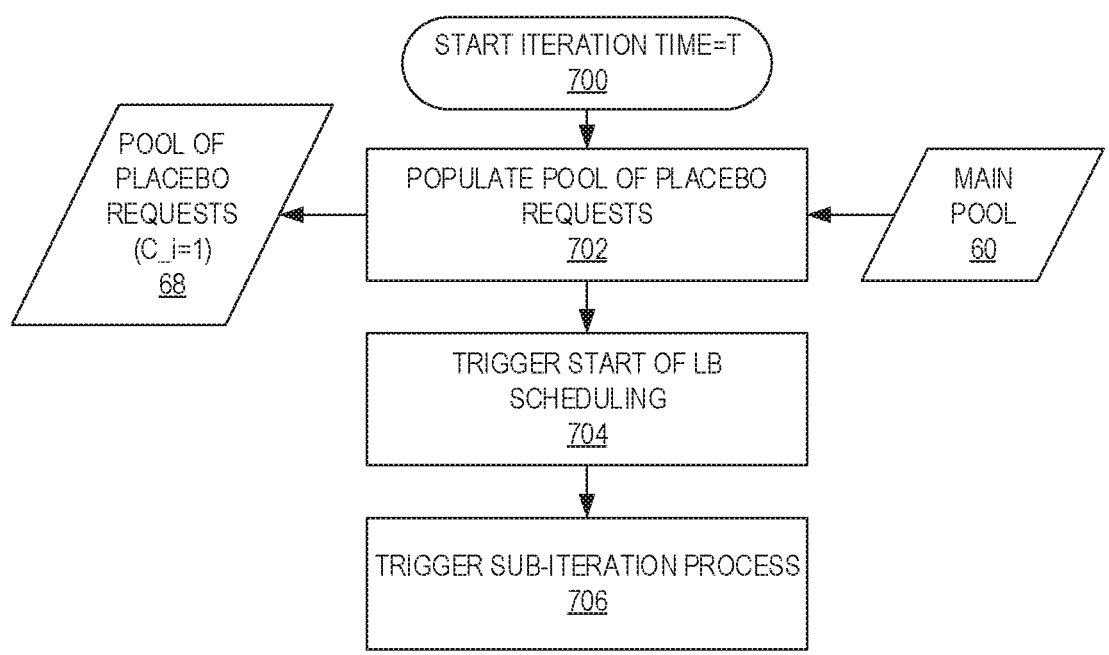

FIG. 8C illustrates a process by which the resource scheduling module 40 triggers the LB scheduling process of FIG. 8B and initiates scheduling of the resource requests in the main pool 60 according to some embodiments of the present disclosure. First, the resource scheduling module 40 starts a new iteration time (T) (step 700). In this embodiment, the resource scheduling module 40 populates a pool of placebo resource requests 68 (step 702). More specifically, in addition to the actual requests, a series of placebo, or imaginary, requests are added to the set of requests. As an example, each placebo request is $R\_i=10\%$ of the soft limit, $L\_i=1$ hour, unlimited $D\_i$, and $C\_i=-1$. The resource scheduling module 40 uses these placebo requests to displace the actual requests to time intervals of lower price and impact factors. In addition, the resource scheduling module 40 triggers the start of the LB request scheduling process of FIG. 8B (step 704) and triggers a sub-iteration process for scheduling resource requests from the main pool 60 (step 706).

Figure 8D:
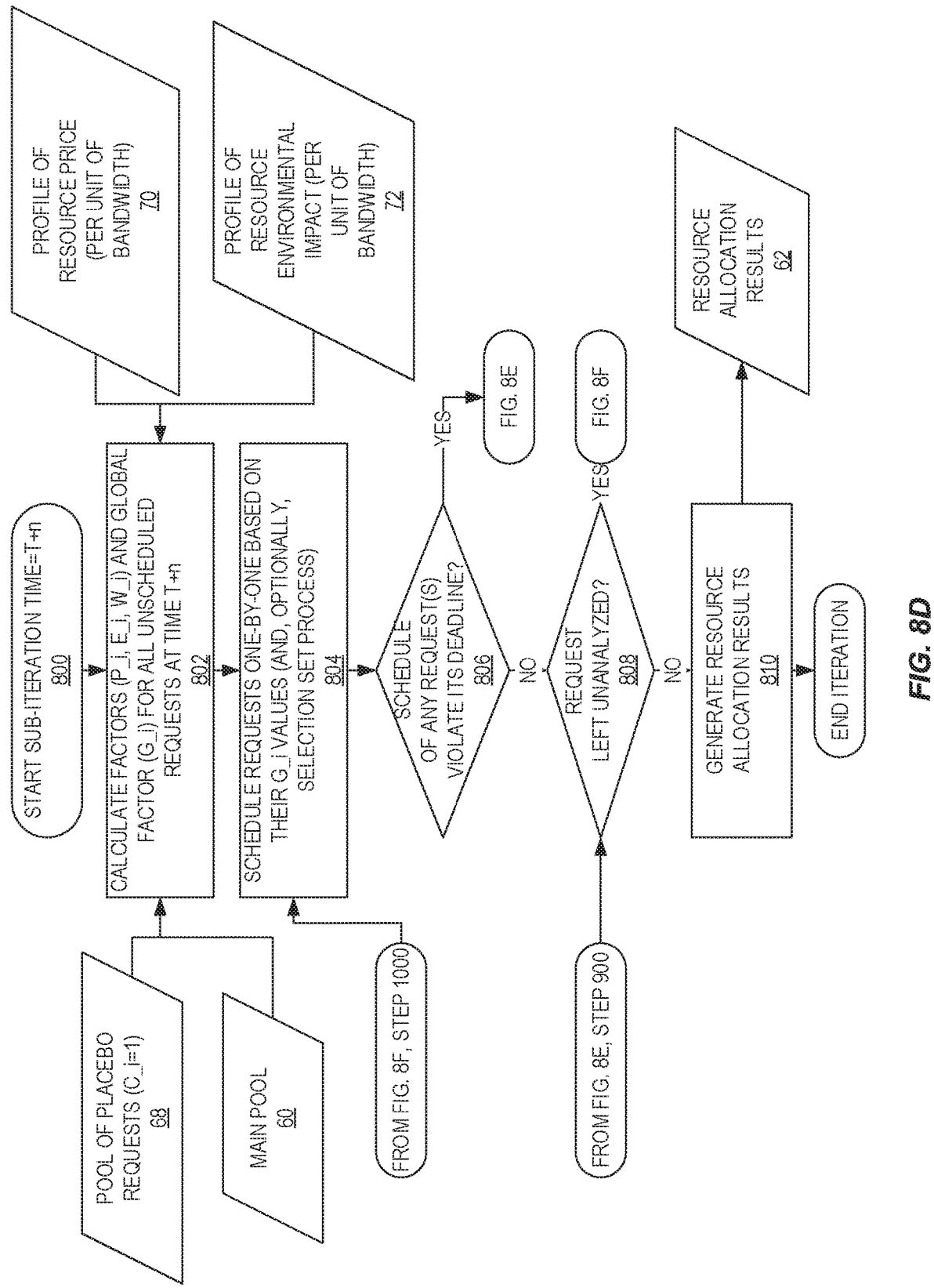

In every iteration of the scheduling process, all received resource requests (except those already allocated in the LB request scheduling process) that have not yet been in the execution phase are considered. Consider the iteration at time T. Inside the iteration, the scheduling process sub-iterates on time intervals relative to T. As illustrated in FIG. 8D, upon triggering the start of a sub-iteration, the resource scheduling module 40 starts a sub-iteration (T+n, where initially n=0) of the scheduling process for the main pool 60 (step 800). In this example, for the sub-iteration T+n, the resource scheduling module 40 calculates price factors ($P\_i$), environment factors ($E\_i$), and load factors ($W\_i$) as well as global factors ($G\_i$) for all unscheduled resource requests in the main pool 60 and the pool of placebo resource requests 68 (step 802). In general, the global factor, or parameter, ($G\_i$) values are indicative of the relative priorities of the respective resource requests. In some embodiments, the global factor ($G\_i$) values for the respective requests are computed based on an optimization of multiple parameters, which, in this example, are the price factors ($P\_i$), environmental factors ($E\_i$), and load factors ($W\_i$). Note, however, that all three of these factors may not be considered in all embodiments (e.g., some embodiments may only consider the price factors and environmental factors). Further, additional or alternative factors may be considered.

In this example, for each resource request, if the price factor ($P\_i$) is not initialized yet, it is initialized as follows. First, $P'\_i=R\_i*p(T+n)$, where p(t) is a profile 70 for resource price per unit of bandwidth over time (t). Different resources may have different price profiles p(t). The price factor ($P\_i$) is then initialized as $P\_i=(P'\_i)^{\wedge}C\_i$. In particular, for an actual request, $P\_i=P'\_i$, and for a placebo request $P\_i=1/P'\_i$.

In some embodiments, a profile 72 of an environmental impact of the resource consumption per unit of bandwidth is provided (e.g., from an external entity such as, e.g., a government agency or utility company). Different resource types may have the same or different environment impact profiles 72. The impact at each (e.g., hourly) time interval could be in the form of a tuple that includes various impacts such as Greenhouse Gas (GHG) emissions and water consumption. The tuple is denoted herein as ($F\_1(t)$, $F\_2(t)$, ... ), where $F\_1$ is environmental factor number 1 and $F\_2$ is environmental factor number 2, and $F\_1$ (t) is the value of the environmental factor $F\_1$ at the specific time t. For each resource request, the environment factor ($E\_i$) is initialized as follows. First, $E'\_i=R\_i*\max[(F\_1(T+n)/F\_(1,95), F\_2(T+n)/F\_(2,95), ...)]$, where for example $F\_(1,95)$ is the upper bound of the 95% confidence interval of the observed $F\_1$ (t) values for all t<T+n. Then, the environment factor ($E\_i$) for the resource request is initialized as $E\_i=(E'\_i)^{\wedge}C\_i$.

For each resource request, the load factor ($W\_i$) is initialized as follows. First $W'\_i=R\_i+L\_i$ is calculated for each request. Then, $W'\_i$ is normalized between −1 and 1: $W''\_i=2*(W'\_i-\min[W\_j])/(\max[W'\_j]-\min[W'\_j])-1$. Then, the absolute value is used as $W\_i:W\_i=abs[W''\_i]$.

For each request, the global factor ($G\_i$) is calculated as: $G\_i=P\_i*E\_i*W\_i*M\_i$.

The resource scheduling module 40 then schedules the requests from the main pool 60 and the pool of placebo resource requests 68 one-by-one based on their global factor ($G\_i$) values (step 804). In some embodiments, the resource requests from the main pool 60 and the pool of placebo resource requests 68 are allocated in the soft limit bandwidth minus the LB bandwidth (i.e., the bandwidth utilized for scheduling the LB requests) using the global factor ($G\_i$) values starting from those having lower global factor ($G\_i$) values in, e.g., the following process:

Among all those requests not yet allocated in the current iteration and also having a requested bandwidth less than the remaining free resource bandwidth at time T+n, the request that has the lowest $G\_i$ is selected. This request is referred to herein as the request with index j. In case that this set is null, i.e., there is no request with a requested bandwidth less than the remaining free resource bandwidth at time T+n, n is advanced to n+1, and then the process is continued at the time associated with the new n value, i.e., T+n+1.

Then, all other requests having global factor ($G\_i$) values that are less than $G\_j*(1.1)$ are also added to request j to construct a selection set.

Using a random process, one of the requests in the selection set is selected and the respective requested resource is allocated to the selected resource request.

This process is repeated until all unallocated resource requests are processed/analyzed.

One reason for considering the selection set process described above is to prevent sub-bidding by the smart home appliances 14, 22 in order to trick the resource scheduling module 40 of the smart home manager 12. In cases where such a concern does not exist, this process could be simplified to only selecting the request j and allocating the requested resources to resource rejection j.

In this example, the resource scheduling module 40 determines whether any of the scheduled resource requests violate their respective scheduling deadlines (step 806). If not, the resource scheduling module 40 determines whether there are any resource requests in the main pool 60 or the pool of placebo resource requests 68 that have not been analyzed (step 808). Here, in some situations, not all resource requests in the main pool 60 and the pool of placebo resource requests 68 will be scheduled for time T+n; however, all resource requests in the main pool 60 and the pool of placebo resource requests 68 should be analyzed to determine whether they should be scheduled for time T+n. If there is(are) resource request(s) remaining to be analyzed, the resource scheduling module 40 generates resource allocation results 62 for the scheduling process (step 810). The resource allocation results 62 include a resource allocation for each scheduled resource request.

Figure 8E:
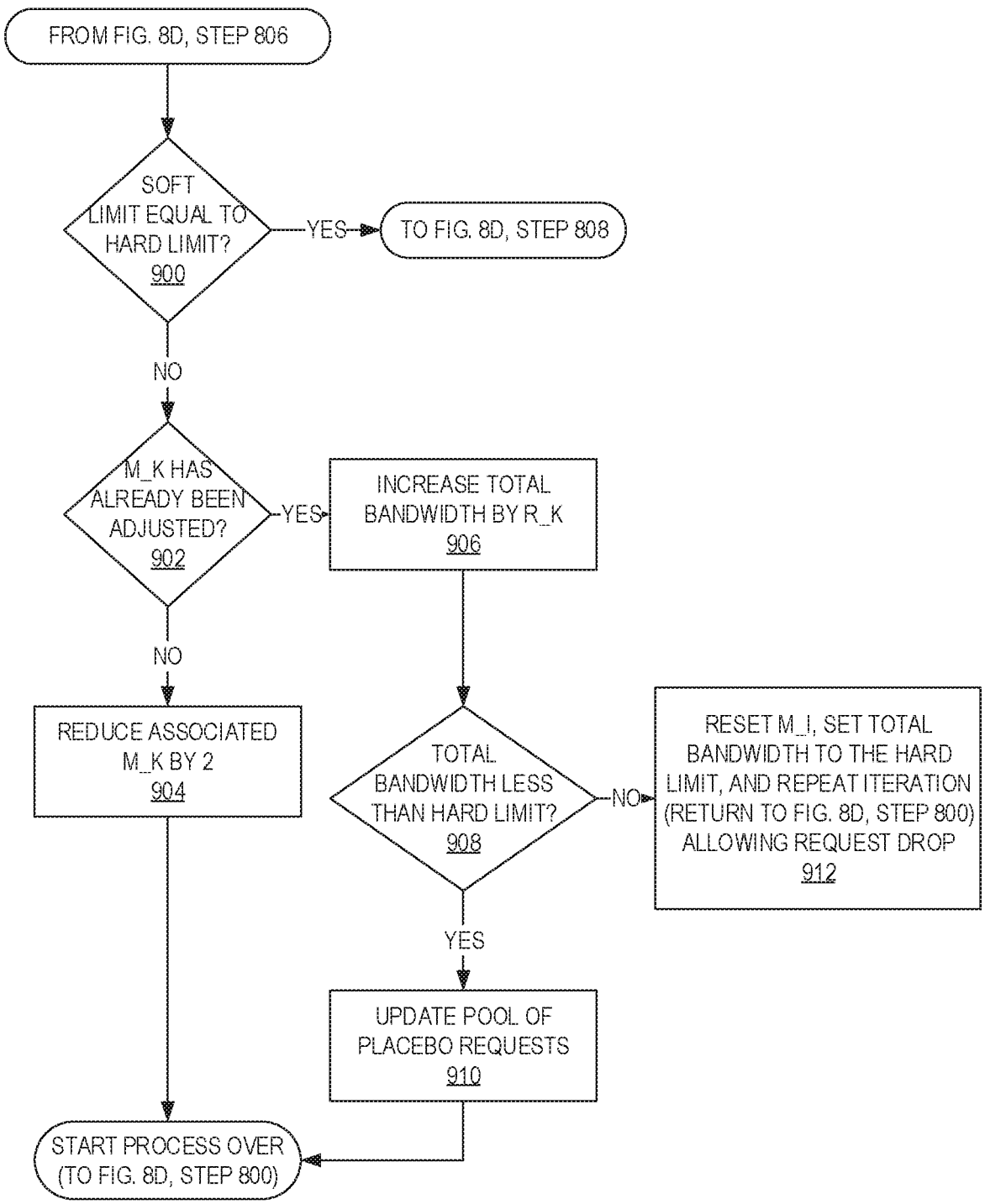

Returning to step 806, if any of the scheduled requests violated its scheduling deadline, the process proceeds to FIG. 8E where the resource scheduling module 40 determines whether the soft limit for the requested resource type(s) is equal to the hard limit (step 900). If not, the resource scheduling module 40 determines whether the degree of tolerance ($M\_i$) values of the request(s) that violate their respective scheduling deadlines have already been adjusted with respect to their original values in a previous sub-iteration (step 902). If not, the resource scheduling module 40 reduces the degree of tolerance ($M\_i$) values of the request(s) that violate their respective scheduling deadlines by, in this example, a factor of 2 (step 904). In this manner, the resource scheduling module 40 indirectly increases the priority of these requests relative to the other requests. The resource scheduling module 40 then returns to step 800 of FIG. 8D to restart the scheduling process for the iteration. Note that the LB scheduling is not repeated, at least in this embodiment.

Returning to step 902, if the $M\_i$ values of the request(s) that violate their respective scheduling deadlines have already been adjusted, the resource scheduling module 40 increases the total resource bandwidth(s) for the requested resource type(s) associated with the resource request(s) that violate their scheduling deadlines by the respective $R\_i$ value(s) (step 906). The resource scheduling module 40 determines whether the increased total bandwidth value(s) is less than the respective hard limit(s) (step 908). If so, the resource scheduling module 40 updates the pool of placebo resource requests 68 based on the new total resource bandwidth limit(s) (step 910). More specifically, the condition is that the total bandwidth times the time interval of all placebo requests (which may be referred to as the volume of the placebo requests) should be higher than the actual soft limit times the latest deadline. With every increase in the soft limit, the product of the increased soft limit and the latest deadline will increase. Considering that each placebo request is of a predefined bandwidth (e.g., 10%) and a predefined duration (e.g., 1 unit of time), then the increase in the soft limit means that the volume of the placebo requests, and thus the number of placebo requests) should also increase. Note that the placebo requests operate to push back, or delay, actual requests as far as possible if factors (e.g., price, environmental impact, etc.) are not currently favorable.

Returning to step 908, if the increased total bandwidth value(s) is not less than the respective hard limit(s), the resource scheduling module 40 resets the $M\_i$ value(s) for the request(s) to their original values, sets the total bandwidth limit(s) for the requested resource(s) the respective hard limit(s), and repeats the iteration of the scheduling process (returns to FIG. 8D, step 800), but allowing the dropping of requests that are unable to be scheduled (step 912).

Returning to step 900, if the soft limit(s) is equal to the respective hard limit(s), the process proceeds to FIG. 8D, step 808.

Figure 8F:
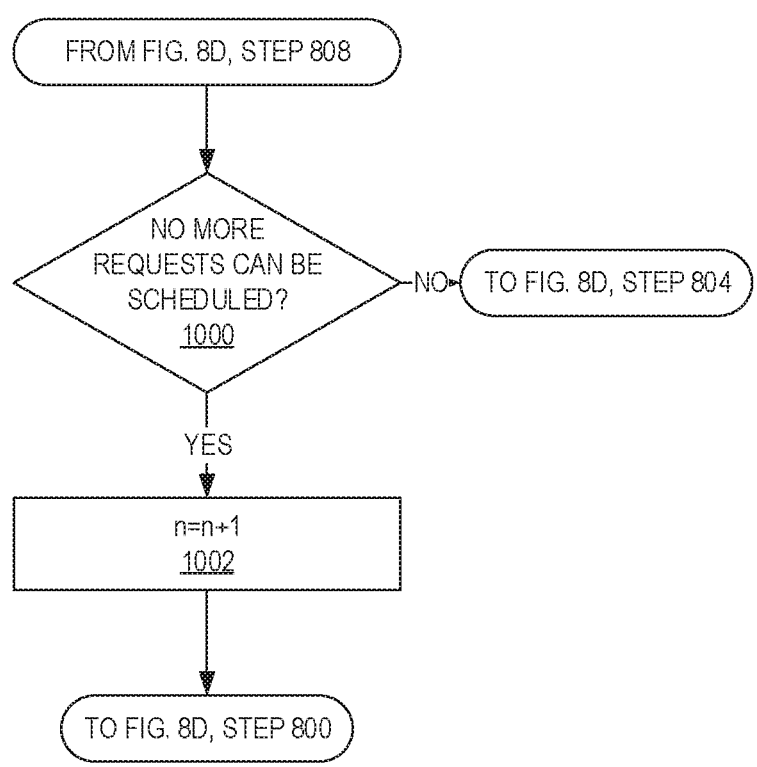

Returning to FIG. 8D, step 808, if there are one or more resource requests in the main pool 60 or the pool of placebo resource requests 68 that are left unanalyzed, the process proceeds to FIG. 8F where the resource scheduling module 40 determines whether no more resource requests can be scheduled for this current sub-iteration in the remaining free resource bandwidth for the requested resource type(s) (step 1000). If no more resource requests can be scheduled for the current sub-iteration, the resource scheduling module 40 increases n: n=n+1 (step 1002), and then returns to FIG. 8D, step 800 to perform scheduling for the next sub-iteration T+n for all non-allocated resource request in the main pool 60 and the pool of placebo resource requests 68. Conversely, if more resource requests can be scheduled in the current sub-iteration, the process returns to FIG. 8D, step 804.

Figure 9:
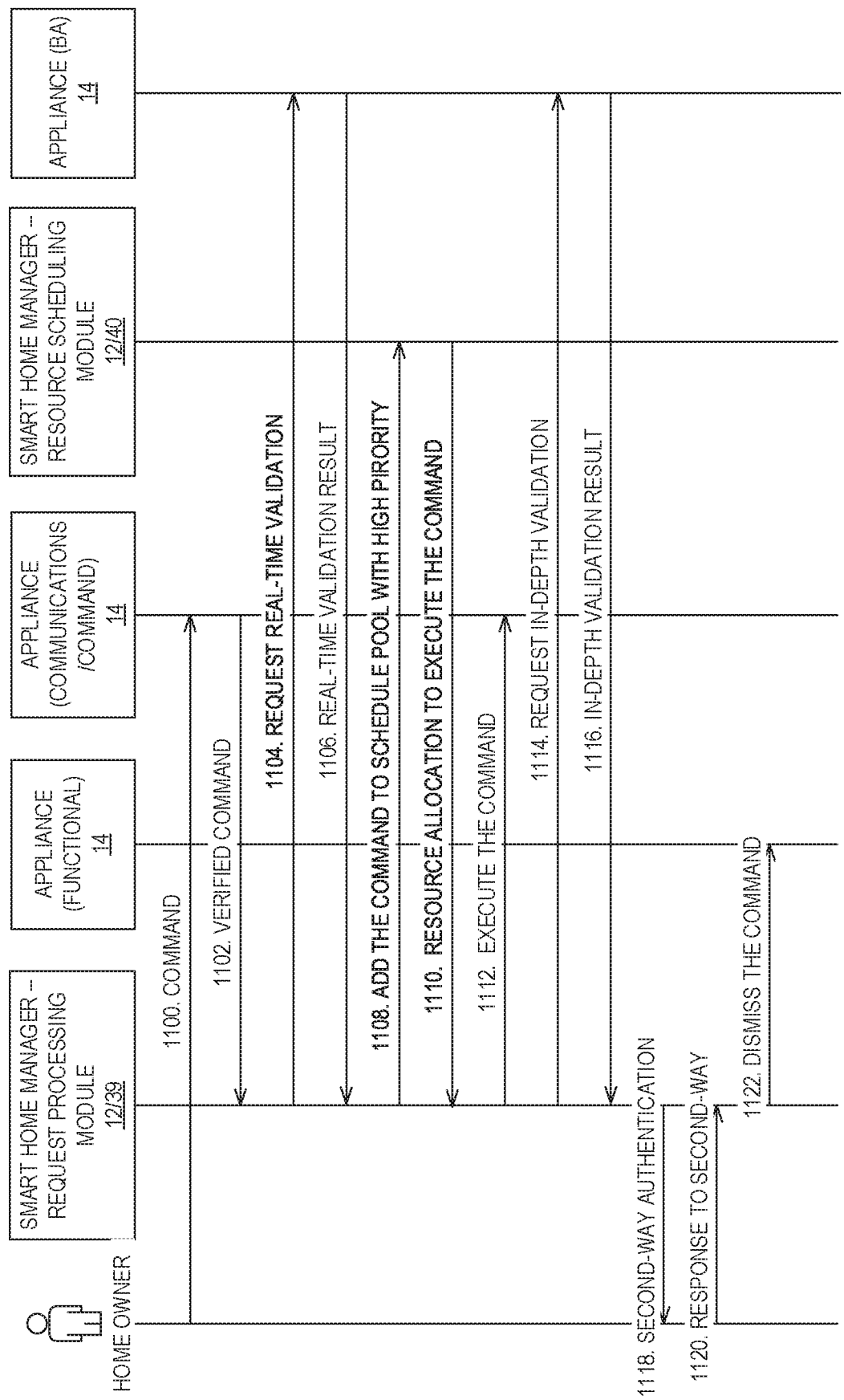
FIG. 9 illustrates the operation of the smart home system of FIG. 1 to receive and process commands from a user or operator of the smart home system according to some embodiments of the present disclosure.

FIGS. 5 through 8F focus on embodiments of the operation of the smart home system 10 for resource requests and allocations. FIG. 9 illustrates the operation of the smart home system 10 to receive and process commands from a user or operator of the smart home system 10 (e.g., the owner or resident of the smart home) according to some embodiments of the present disclosure. A communications/command smart home appliance, which may be one of the smart home appliances 14 or a virtual appliance 22, is registered with the smart home manager 12, e.g., in a human-involved two-way confirmation cycle. In some embodiments, the communications/command smart home appliance uses biometric signatures to validate its proximity to the human (user or operator). These events of human validation may take place at regular time periods and also prior to receiving a command from the user/operator.

As illustrated in FIG. 9, the user/operator initiates a command cycle with the communications/command smart home appliance via providing a command to the communications/command smart home appliance (step 1100). The command may be provided as a voice command, provided via an input device (e.g., a touchscreen), or the like. Optionally, the command is verified by the communications/command smart home appliance. The communications/command smart home appliance then sends the command to the smart home manager 12, where the command is received by the request processing module 39 (step 1102). In this example, the smart home manager 12 initiates or requests a real-time validation of consequences of the command via a behavior analysis smart home appliance (step 1104). Note that the behavior analysis smart home appliance may alternatively be implemented as a sub-component of the smart home manager 12, as described above. The behavior analysis smart home appliance returns a real-time validation result to the smart home manager 12 (step 1106).

Assuming validation (e.g., assuming that the determined risk of executing the command as determined via the real-time analysis is less than a predefined threshold), the request processing module 39 of the smart home manager 12 adds the command to the pool of resource requests with high priority (step 1108). A resource allocation for the command is then scheduled and provided to the request processing module 39 of the smart home manager 112 (step 1110). The request processing module 39 then initiates execution of the command by the appropriate functional smart home appliance(s) using the allocated resources (step 1112).

The smart home manager 12 also requests an in-depth, or non-time-restricted, analysis of the command by the behavior analysis smart home appliance (step 1114). The behavior analysis smart home appliance performs the in-depth analysis of the command and sends a result of the analysis to the smart home manager 12 (step 1116). At the same time, the smart home manager 12 starts another channel of communication with the home owner in order to provide a second way of authentication of the original request. This channel may be set up using another mode (e.g., Wi-Fi, Short Message Service (SMS), voice, etc.) of communication with respect to the original channel (step 1118). The home owner responds by confirming the original request or denying the original request (step 1120). In some embodiments, if there is no response from the home owner, then the request is assumed to be denied. If the non-real-time analysis indicates that the execution of the command should be reversed (e.g., risk level is above a predetermined threshold), then the smart home manager 12 dismisses (stops execution of) the command (step 1122).

The standard of communication within the smart home system 10 described herein, and in any solution built using the smart home manager 12, is an important advantage over conventional smart home systems. In some embodiments, the communication within the smart home system 10 is an "ordered" form of communication, i.e., the smart home manager 12 governs the smart home system 10 and all appliances 14, 22 are required to comply to its syntax in order to access resources. Therefore, the communication within the smart home system 10 does not require any form of inter-appliance or inter-device connectivity and communications. Although it does not forbid such inter-appliance communications, the smart home system 10 and the smart home manager 12 function even in the absence of such inter-connectivity at the level of appliances and devices.

The communication within the smart home system 10 is message-based. In each resource request from a (functional)

smart home appliance 14, 22, the resource request is, in some embodiments, a message that contains an Identifier (ID) of the smart home appliance 14, 22 making the request, an ID of the requested resource, the amount of the resource requested, a relative earliest possible start time for scheduling the request, a duration of consumption of the requested resource, and a relative latest possible start time (deadline) for scheduling the resource request. Each of these parameters is, at least in some embodiments, encoded within the message. For example, in some embodiments, each of these parameters is encoded in separate bytes using a low-density parity-check code. For example, for the resource ID byte, the following sample table may be used for encoding:

| Resource | Bit 1 | Bit 2 | Bit 3 | Bit 4 | Bit 5 (34) | Bit 6 (24) | Bit 7 (13) | Bit 8 (12) | Hex Code |
|---|---|---|---|---|---|---|---|---|---|
| Electricity | 0 | 0 | 0 | 1 | 1 | 1 | 0 | 0 | 1C |
| Internet | 0 | 0 | 1 | 0 | 1 | 0 | 1 | 0 | 2A |
| LTE | 0 | 0 | 1 | 1 | 1 | 1 | 1 | 0 | 3E |
| Water | 0 | 1 | 0 | 0 | 0 | 1 | 0 | 1 | 45 |
| Gas | 0 | 1 | 0 | 1 | 1 | 1 | 0 | 1 | 5D |

For the time-related fields of the request, such as the requested duration of resource consumption, an additive byte-wise coding may be used. For example, each byte expresses the unit of time and its count in addition to presence or absence of an upcoming byte. The first 4 bits are used for unit and presence/absence flag:

| Unit | Bit 1 | Bit 2 |
|---|---|---|
| Second | 0 | 0 |
| Minute | 1 | 0 |
| Hour | 0 | 1 |
| Next Byte? | Bit 3 | Bit 4 |
| Yes | 0 | 1 |
| No | 1 | 0 |

The second 4 bits of the byte are used for the amount of unit represented by the byte. Note that the resource request messages could alternatively be encoded in various other more-complex data forms, such as Extensible Markup Language (XML) and JavaScript Object Notation (JSON) by way of example, among others.

The manufactures of dumb or low-intelligence smart home appliances 14, 22 could hardcode a set of pre-designed request messages in the smart home appliance 14, 22 that are sent out by the smart home appliance 14, 22 appliance depending on, e.g., its internal status.

In some embodiments, the acknowledgement of a resource allocation sent from the smart home manager 12 to the smart home appliance 14, 22 that issued the resource request includes the ID of the smart home appliance 14, 22, the status of the resource request (e.g., allocated or not allocated, but may also include other statuses such as "in process" in order to, e.g., acknowledge receipt of the request and avoid repeated submission of the request from the appliance-side), a relative actual starting time allocated to the smart home appliance 14, 22, and a unique "passcode." A passcode may be, e.g., a random number that the smart home manager 12 generates for each individual request that it sends out. The smart home appliance 14, 22 should then use the same passcode in future communications with the smart home manager 12 (e.g., in a subsequent request to cancel the request). The passcode is optional. In the case of "dumb" smart home appliances 14, 22 that may not be able to read the allocated starting time information from the resource allocation message, the smart home manager 12 may send the resource allocation message at the moment that the use of the allocated resources should starts (i.e., the resource allocation message can be used as a "start" signal to the smart home appliance 14, 22). In other embodiments, a smart home appliance 14, 22 (e.g., a "dumb" smart home appliance 14, 22) starts consuming the resource immediately after sending the resource request, and the smart home manager 12 enforces the resource allocation scheduled for the smart home appliance 14, 22 by commanding the associated smart gateway 16.

In some embodiments, once granted a resource allocation, a smart home appliance 14, 22 may cancel the resource allocation and may send a corresponding "cancel" message to the smart home manager 12. In some embodiments, a cancel message may be required to include the correct passcode communicated to the smart home device 14, 22 in the resource allocation message.

The communications between the smart home manager 12 and the smart gateways 16 is more flexible in terms of syntax. Also, in addition to the messages of allocation and reservation of a resource on a smart gateway 16, pulling of the consumption data and history from the smart gateway 16 is considered in the communications between the smart home manager 12 and the smart gateways 16.

Figure 10:
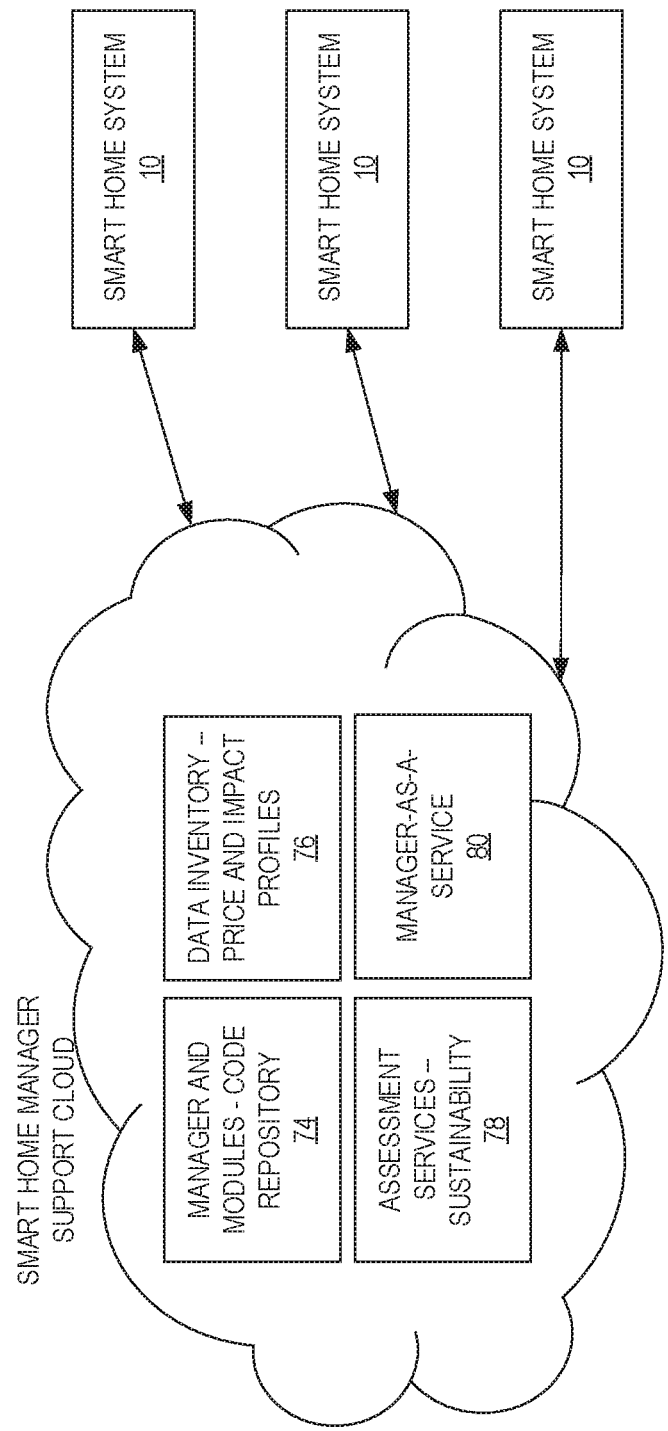
FIG. 10 illustrates an example of a hybrid cloud-based and on-premises based architecture in which multiple smart home systems are supported by a cloud-based system.

The smart home manager 12 is, at least in some embodiments, designed to operate even in the case of loss of communications with the outside world. However, the development behind the smart home manager 12 including the components and especially the software part are, at least in some embodiments, hosted and managed on a trusted cloud that may be similar to the concept of the Green Sustainable Telco-grade Cloud (GSTC), as illustrated in FIG. 10. As illustrated in FIG. 10, a code repository 74, a data inventory 76, assessment service(s) 78, and manager-as-a-service 80 components may be implemented in the cloud. For example, on the first activation of the IM card 24 on the smart home manager 12, or in the cases of recovery from a failure, the smart home manager code and other related modules may be downloaded from the code repository 74 and installed using, e.g., the Telco connection from the designated hosting cloud. The price profiles and the environmental impact profiles for the different resource types are also hosted on the cloud in the data inventory 76 and are downloaded on regular basis, or in association with push commands initiated by the utilities. Assessment services, such as those of environmental impact assessment, are hosted on the cloud and are requested in cases where the owner is interested to become aware of the impact of some of their actions and activities.

Note that the manager-as-a-service 80 may, for instance, take over management of the smart home system 10 in the event that the smart home manager 12 fails or goes off line (until such time that the smart home manager 12 is repaired/replaced or comes back online). Alternatively, in some embodiments, some home owners could opt to use the manager-as-a-service 80 instead of the smart home manager 12, which is local to the smart home. In that case, the manager-as-a-service 80 would operate to provide the same functionality of the smart home manager 12 described above.

Now, a number of example uses cases will be described. Note that these use cases are examples and should not be construed so as to limit the scope of the embodiments described herein.

Use Case 1: An interesting use case of the smart home system 10 including the smart home manager 12 (at the system level or at the component level) is the use case of reducing the capacity liability of the electricity grid.

An electricity grid provides a main circuit breaker to each household with a limit of a few hundred Amperes (A). One aspect of such breaker limit is its implicit liability on the grid to provide (possibly at the same time) electric current to the households up to the limit of a few hundred Amperes (A). In this use case, the smart home manager 12 could help to reduce such a liability, and therefore could significantly reduce the pressure on the grid's capacity and its maintenance.

To be specific, the Province of Ontario is used as an example in this use case. The peak power demand this year (2015) was recorded on January $7^{th}$ at 6 PM EST at the scale of 21,814 megawatts (MW). The associated capacity (in-use or reserved) could be estimated at 23,387 MW (1,573 MW of operating reserve requirement). This could be considered equivalent to an average 39.86 A per household at the moment of peak demand, considering 4,887,510 subscribers.

By placing a soft limit of 20 A per household and enforcing it using a smart home manager 12 enabled smart home system 10, the maximum possible power demand would be 11,730 MW (that includes an operating reserve requirement of 1,573 MW). This is even less than the installed nuclear capacity of that grid.

The two nuclear plants associated with this grid are scheduled for refurbishment in the period starting in 2016 and possibly ends in 2031. The sequence of refurbishments affects only two or three units at the same time.

If the smart home manager 12 is fully or partially implemented in a considerable number of households, the grid could properly function even in the shadow of having one or two units of the nuclear fleet under refurbishment. The natural gas plants could be put on hold or have their output exported to other provinces and states that may still use coal as the primary electricity-generating fuel. This would have a great environmental impact within the province and also at the bigger scales of Canada and North America.

For example, if the Ontario grid could lock 12,000 MW capacity for itself, the rest of its capacity, i.e., 11,000 MW (=23,000 MW−12,000 MW), could be exported to the neighboring states. If we assume only 10% of this capacity is exported on average, and if we assume a marginal profit of 2 cents per kilowatt hour (kWh), the province would benefit from a yearly M\$192.72 (=\$0.02*11,000 MW*24*365*0.1*1000) profit from export.

The avoided GHG emissions associated to this export would be 4.02 MtCO$_2$-eq (=(0.470-0.053) kgCO$_2$-eq/kWh*11,000 MW*24*365*0.1*1000).

The Ontario grid on Q1 of 2015 had a GHG emissions level of 2 MtCO$_2$-eq for an output of 37.5 Terawatt hours (TWh). The GHG emissions factor would be 0.053 kgCO$_2$-eq/kWh. For a typical neighboring state with more than 50% share of coal-generated electricity, the GHG emissions factor would be at least 0.470 kgCO$_2$-eq/kWh (=0.5*0.939 kgCO$_2$-eq, assuming Bituminous coal at 0.939 kgCO$_2$-eq/kWh).

Use Case 2: Use case of avoiding the environmental impact of centralized smart home solutions.

In the definition of broadband Internet service issued by the Federal Communications Commission (FCC), a minimum of 3 Mbps upstream bandwidth is required. This bandwidth would be mostly used to pull and transfer the telemetry data collected by the sensory devices up to the central data center.

Assuming that on average 50% of this bandwidth is used, this is equal to 3 Mbps×3600×24×365/2/8/1024=5, 774.41 Gigabytes (GB) data transfer per household to the data center.

The energy consumption transfer 1 GB of data in the local access network is estimated at 0.080 kWh in addition to 0.267 kWh embodied energy consumption in the network equipment [Farrahi2014f, Malmodin2014]. The similar values can be used for the non-local (metro) access network part. Therefore, total energy consumption associated to 1 GB data upload is equal to 0.694 kWh (the consumption related to the core network in these calculations has been ignored). The total energy consumption of the yearly upload would be 4.01 MWh.

The equivalent yearly GHG footprint per household associated with 4.01 MWh energy consumption would be 212.53 kgCO$_2$-eq (considering the average footprint factor of the Ontario grid: 0.053 kgCO$_2$-eq/kWh). The proposed solution or any other solution developed based on the smart home manager 12 would avoid this footprint.

The total yearly avoided energy consumption and footprint for the case of the Province of Ontario with a count of 4,887,510 households would be 19.58 TWh and 1.04 MtCO$_2$-eq respectively. This energy consumption and environmental footprint is avoided if a smart home manager 12 based approach is considered instead of a centralized solution.

Even in the case of an optimistic situation where the average percentage use of the upstream bandwidth is reduced by a factor of 10 to 5%, the yearly associated avoided energy consumption and footprint would be 1.96 TWh and 103.9 MtCO$_2$-eq respectively at the scale of the province.

The additional consumption and footprint in the data centers associated with handling a large amount of data received from households in the case of centralized solutions has not been calculated or counted.

It is worth mentioning that these calculations do not estimate the avoided consumption and footprint achievable because of smart management of appliances and activities in the household.

Use Case 3: Use case of saving on peak hours in a particular household.

Assume that the average electricity consumption of an unregulated household during the peak hours is 70% of the yearly peak of 39.86 A (see use case 1), and also set the soft limit of a smart home having the smart home system 10 including the smart home manager 12 to 20 A. For a peak-hours period of 3 hours, and assuming the price brackets of the Ontario grid, i.e., off-peak price of 7.7 cents/kWh and on-peak price of 14.0 cents/kWh, the displaced electricity consumption of 7.90 A off the peak hours would be equal to \$65.40 (=(14.0−7.7) cents/kWh*7.90 A*120 V*3 h*365/1000/100) saving on the yearly electricity bill of the household.

It is worth mentioning the calculated saving of $65.40 is solely achieved by displacing the consumption, and it does not include the impact of other smart activities that carried out in a smart house.

For a household of average consumption of 800 kWh per month, the total yearly consumption-related portion of the electricity bill would be (14.0*(27.9*120*3*365/1000/12)+7.7*(800−27.9*120*3*365/1000/12))*12/100, which is equal to $970.16. Therefore, the savings obtained by smart home manager 12 enabled displacement accounts for 65.40/970.16 or 6.74% of the electricity bill.

The embodiments of the smart home system 10, which are built around the smart home manager 12, provide a non-centralized smart home solution that provides an appropriate level of trust for the owner/resident of the smart home, while at the same time it stands agnostic with respect to appliance vendors, Telcos and access providers, inside-house connectivity technologies, and appliances in order to prevent vendor lock-in.

From the operation point of view, embodiments of the smart home system 10 can be installed and operated by any person, even if they are not technology savvy or literate thanks to its abstraction of identity from the smart home system 10 to an IM card 24 and also its enforcement of the smart home manager 12 compatibility on all smart home appliances 14, 22 (e.g., by providing generic but accurate syntaxes for communication among components of the smart home system 10 that includes also any third-party smart home appliances 14, 22).

Embodiments of the present disclosure may be at three scales: i) a full-scale smart home system 10, ii) a smart home manager 12 that can be integrated within other smart home systems, and iii) a smart resource scheduling and management module(s) and algorithms that can be used in other applications.

While not limited to or by any particular advantage, embodiments of the smart home system 10 and the smart home manager 12 described herein include: a non-centralized smart home solution, hybrid physical premise and cloud architecture (e.g., the embodiment of FIG. 10), ease of use, ease of development (e.g., third-party smart home appliances 14, 22 can easily be developed and added to the smart home system 10), agnostic to manufacturer and technologies used, and standard communications (e.g., APIs) for communication between the smart home manager 12 and other smart home components.

The following acronyms are used throughout this disclosure.

A Ampere or Amp
A/C Air Conditioning
API Application Program Interface
ASIC Application Specific Integrated Circuit
CASHEM Context-Aware Smart Home Energy Management
CPU Central Processing Unit
FCC Federal Communications Commission
FPGA Field Programmable Gate Array
GB Gigabyte
GHG Greenhouse Gas
GPS Global Positioning System
GSTC Green Sustainable Telco-grade Cloud
ID Identifier
IM Identification Module
IoT Internet of Things
JSON JavaScript Object Notation
kWh Kilowatt Hour
LB Low Bandwidth
LED Light Emitting Diode
Mbps Megabits per Second
MW Megawatt
SMS Short Message Service
TWh Terawatt Hour
XML Extensible Markup Language Those skilled in the art will recognize improvements and modifications to the embodiments of the present disclosure. All such improvements and modifications are considered within the scope of the concepts disclosed herein and the claims that follow.

What is claimed is:

1. A method of operation of a manager of a smart home system, comprising:
   receiving, by the manager, a resource request from a smart home appliance for a resource of the smart home system, the resource request comprising information indicative of a resource bandwidth being requested by the smart home appliance, information indicative of a scheduling deadline for the resource request, and information indicative of a duration of time for which the resource bandwidth is being requested;
   determining, by the manager, whether the resource request is a low-bandwidth request;
   adding, by the manager, the resource request to a pool of low-bandwidth resource requests when the resource request is a low-bandwidth request, and adding the resource request to a main pool of non-executing resource requests when the resource request is not a low-bandwidth request;
   scheduling, by the manager, the resource request based on the resource bandwidth being requested by the smart home appliance, the duration of time for which the resource bandwidth is being requested, the scheduling deadline for the resource request, and a total resource bandwidth limit for the smart home system for the resource requested via the resource request; and
   sending a confirmation of a resource allocation from the manager to the smart home appliance, the resource allocation being indicative of a time period during which the resource request from the smart home appliance has been scheduled.

2. The method of claim 1 wherein the total resource bandwidth limit is a soft limit on a total resource bandwidth for the smart home system for the resource requested via the resource request.

3. The method of claim 2 wherein scheduling the resource request comprises scheduling the resource request based on the resource bandwidth being requested by the smart home appliance, the duration of time for which the resource bandwidth is being requested, the soft limit, and a hard limit on the total resource bandwidth of the smart home system for the resource requested via the resource request.

4. The method of claim 1 further comprising submitting the resource allocation to a smart gateway that controls access to the resource by the smart home appliance in accordance with the resource allocation.

5. The method of claim 1 wherein a low-bandwidth request is a resource request for a resource bandwidth that is less than a predefined threshold.

6. The method of claim 1 wherein the steps of receiving the resource request, determining whether the resource request is a low-bandwidth request, adding the resource request to the pool of low-bandwidth resource requests if the resource request is a low-bandwidth request, and adding the resource request to the main pool of non-executing resource requests if the resource request is not a low-bandwidth request are repeated for a plurality of resource requests.

7. The method of claim 6 further comprising performing a scheduling process, the scheduling of the resource request being part of the scheduling process, wherein performing the scheduling process comprises:
   scheduling low-bandwidth requests that are in the pool of low-bandwidth resource requests independently from one another.

8. The method of claim 7 wherein performing the scheduling process further comprises, after scheduling the low-bandwidth requests that are in the pool of low-bandwidth resource requests independently from one another, adding any unscheduled low-bandwidth requests that are in the pool of low-bandwidth resource requests to the main pool of non-executing resource requests.

9. The method of claim 7 wherein performing the scheduling process further comprises:
   scheduling resource requests that are in the main pool of non-executing resource requests taking into consideration soft limits or hard limits on total resource bandwidth for corresponding resources.

10. The method of claim 9 wherein scheduling the resource requests that are in the main pool of non-executing resource requests comprises scheduling the resource requests that are in the main pool of non-executing resource requests taking into consideration the soft limits and the hard limits on the total resource bandwidth for the corresponding resources and deadlines for scheduling the resource requests.

11. The method of claim 7 wherein performing the scheduling process further comprises:
   calculating global parameter values for resource requests that are in the main pool of non-executing resource requests, the global parameter values of the resource requests being indicative of relative priorities of the resource requests that are in the main pool of non-executing resource requests; and
   scheduling the resource requests that are in the main pool of non-executing resource requests based on the global parameter values of the resource requests and a soft total resource bandwidth limit for the smart home system for a corresponding resource(s).

12. The method of claim 11 wherein, for each resource request that is in the main pool of non-executing resource requests, a global parameter value for the resource request is a function of one or more of a group of parameters consisting of: the resource bandwidth requested via the resource request, the duration of time for which the resource bandwidth is requested, the scheduling deadline for the resource request, a degree of tolerance of the resource request relative to other resource requests, a resource price for the resource requested by the resource request, and an environmental impact of the resource requested by the resource request.

13. The method of claim 11 wherein performing the scheduling process further comprises:
   determining that the resource requests scheduled via the step of scheduling the resource requests that are in the main pool of non-executing resource requests do not violate corresponding scheduling deadlines;
   determining that there are no remaining resource requests in the main pool of non-executing resource requests to be scheduled; and
   upon determining that the resource requests do not violate the corresponding scheduling deadlines and determining that there are no remaining resource requests in the main pool of non-executing resource requests to be scheduled, generating resource allocation results that are indicative of resource allocations for the resource requests resulting from performing the scheduling process.

14. The method of claim 11 wherein performing the scheduling process further comprises:
   determining that at least one of the resource requests scheduled via the step of scheduling the resource requests that are in the main pool of non-executing resource requests violates a corresponding scheduling deadline; and
   upon determining that at least one of the resource requests scheduled via the step of scheduling the resource requests that are in the main pool of non-executing resource requests violates the corresponding scheduling deadline, increasing the total resource bandwidth limit for the smart home system for the resource requested via the at least one of the resource requests from the soft total resource bandwidth limit to a value that is greater than the soft total resource bandwidth limit and less than or equal to a hard limit; and
   repeating the steps of calculating the global parameter values and scheduling the resource requests based on the increased total resource bandwidth limit.

15. The method of claim 11 wherein performing the scheduling process further comprises:
   determining that at least one of the resource requests scheduled via the step of scheduling the resource requests that are in the main pool of non-executing resource requests violates a corresponding scheduling deadline;
   upon determining that at least one of the resource requests scheduled via the step of scheduling the resource requests that are in the main pool of non-executing resource requests violates the corresponding scheduling deadline, adjusting, directly or indirectly, a global parameter value for the at least one of the resource requests; and
   repeating the step of scheduling the resource requests.

16. The method of claim 11 wherein performing the scheduling process further comprises:
   determining that the resource requests scheduled via the step of scheduling the resource requests that are in the main pool of non-executing resource requests do not violate corresponding scheduling deadlines;
   determining that there are remaining resource requests in the main pool of non-executing resource requests to be scheduled; and
   upon determining that the resource requests do not violate the corresponding scheduling deadlines and determining that there are remaining resource requests in the main pool of non-executing resource requests to be scheduled, determining whether any additional resource requests can be scheduled for a current time instance for which scheduling is being performed;
   upon determining that additional resource requests can be scheduled for the current time instance, scheduling at least one of the remaining resource requests for the current time instance; and
   upon determining that additional resource requests cannot be scheduled for the current time instance, proceeding to perform scheduling for a next time instance.

17. The method of claim 1 further comprising:
   adding the resource request to a main pool of non-executing resource requests.

18. The method of claim 17 wherein the steps of receiving the resource request and adding the resource request to the main pool of non-executing resource requests are repeated for a plurality of resource requests.

19. The method of claim 18 further comprising performing a scheduling process, the scheduling of the resource request being part of the scheduling process, wherein performing the scheduling process comprises:
scheduling resource requests that are in the main pool of non-executing resource requests taking into consideration soft limits or hard limits on the total resource bandwidth for corresponding resources.

20. The method of claim 19 wherein scheduling the resource requests that are in the main pool of non-executing resource requests comprises scheduling the resource requests that are in the main pool of non-executing resource requests taking into consideration the soft limits and the hard limits on total resource bandwidth for the corresponding resources and deadlines for scheduling the resource requests.

21. A manager of a smart home system, comprising:
one or more communication interfaces;
one or more processors; and
memory storing instructions executable by the one or more processors whereby the manager is operable to:
receive, via the one or more communication interfaces, a resource request from a smart home appliance for a resource of the smart home system, the resource request comprising information indicative of a resource bandwidth being requested by the smart home appliance, information indicative of a scheduling deadline for the resource request, and information indicative of a duration of time for which the resource bandwidth is being requested;
determine whether the resource request is a low-bandwidth request;
add the resource request to a pool of low-bandwidth resource requests when the resource request is a low-bandwidth request, and add the resource request to a main pool of non-executing resource requests when the resource request is not a low-bandwidth request;
schedule the resource request based on the resource bandwidth being requested by the smart home appliance, the duration of time for which the resource bandwidth is being requested, the scheduling deadline for the resource request, and a total resource bandwidth limit for the smart home system for the resource requested via the resource request; and
send, via the one or more communication interfaces, a confirmation of a resource allocation to the smart home appliance, the resource allocation being indicative of a time period during which the resource request from the smart home appliance has been scheduled.

22. A non-transitory computer readable medium comprising software instructions executable by one or more processors of a computing system to:
receive a resource request from a smart home appliance for a resource of a smart home system, the resource request comprising information indicative of a resource bandwidth being requested by the smart home appliance, information indicative of a scheduling deadline for the resource request, and information indicative of a duration of time for which the resource bandwidth is being requested;
determine whether the resource request is a low-bandwidth request;
add the resource request to a pool of low-bandwidth resource requests when the resource request is a low-bandwidth request, and add the resource request to a main pool of non-executing resource requests when the resource request is not a low-bandwidth request;
schedule the resource request based on the resource bandwidth being requested by the smart home appliance, the duration of time for which the resource bandwidth is being requested, the scheduling deadline for the resource request, and a total resource bandwidth limit for the smart home system for the resource requested via the resource request; and
send a confirmation of a resource allocation to the smart home appliance, the resource allocation being indicative of a time period during which the resource request from the smart home appliance has been scheduled.

* * * * *